United States Patent
Zhang

(10) Patent No.: US 12,082,064 B2
(45) Date of Patent: Sep. 3, 2024

(54) METHODS AND APPARATUS FOR LINK HANDOVER

(71) Applicant: DATANG MOBILE COMMUNICATIONS EQUIPMENT CO., LTD., Beijing (CN)

(72) Inventor: Dajun Zhang, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 599 days.

(21) Appl. No.: 17/280,870

(22) PCT Filed: Sep. 27, 2019

(86) PCT No.: PCT/CN2019/108504
§ 371 (c)(1),
(2) Date: Mar. 27, 2021

(87) PCT Pub. No.: WO2020/063845
PCT Pub. Date: Apr. 2, 2020

(65) Prior Publication Data
US 2022/0014989 A1      Jan. 13, 2022

(30) Foreign Application Priority Data
Sep. 28, 2018   (CN) .......................... 201811142462.1

(51) Int. Cl.
*H04W 36/08*   (2009.01)
*H04W 12/03*   (2021.01)
(Continued)

(52) U.S. Cl.
CPC ........... *H04W 36/08* (2013.01); *H04W 12/03* (2021.01); *H04W 36/0016* (2013.01);
(Continued)

(58) Field of Classification Search
CPC ..... H04W 36/08; H04W 36/38; H04W 36/02; H04W 12/03; H04W 36/18;
(Continued)

(56) References Cited

U.S. PATENT DOCUMENTS

2012/0021747 A1   1/2012   Brandt et al.
2015/0071250 A1   3/2015   Dai et al.
(Continued)

FOREIGN PATENT DOCUMENTS

CN   1930794 A      3/2007
CN   102144417 A    8/2011
(Continued)

OTHER PUBLICATIONS

English translation of WO2019/210813 A1, 2019, retrieved from PE2E Search on Oct. 24, 2023 (Year: 2019).*

(Continued)

*Primary Examiner* — Omar J Ghowrwal
(74) *Attorney, Agent, or Firm* — Ladas & Parry, LLP

(57) ABSTRACT

A link handover method, a network entity, and a terminal are provided. The method includes: sending a first link handover instruction to a second network entity, and maintaining a first data transmission link with a terminal; receiving a link handover response fed back by the second network entity according to the first link handover instruction; sending a second link handover instruction to the terminal according to the link handover response; wherein the second link handover instruction carries radio resource control (RRC) reconfiguration information for establishing a second data transmission link between the terminal and the second network entity.

19 Claims, 8 Drawing Sheets

(51) Int. Cl.

| | |
|---|---|
| *H04W 36/00* | (2009.01) |
| *H04W 36/02* | (2009.01) |
| *H04W 36/18* | (2009.01) |
| *H04W 36/38* | (2009.01) |
| H04W 12/04 | (2021.01) |
| H04W 36/14 | (2009.01) |
| H04W 76/15 | (2018.01) |
| H04W 76/16 | (2018.01) |

(52) U.S. Cl.
CPC ....... *H04W 36/0038* (2013.01); *H04W 36/02* (2013.01); *H04W 36/18* (2013.01); *H04W 36/38* (2013.01); *H04W 12/04* (2013.01); H04W 36/00698 (2023.05); H04W 36/087 (2023.05); H04W 36/142 (2023.05); *H04W 76/15* (2018.02); *H04W 76/16* (2018.02)

(58) Field of Classification Search
CPC ......... H04W 36/0016; H04W 36/0038; H04W 12/04; H04W 36/14; H04W 76/15; H04W 76/16; H04W 36/0069; H04W 36/00698; H04W 36/087; H04W 36/142
See application file for complete search history.

(56) References Cited

U.S. PATENT DOCUMENTS

| | | | |
|---|---|---|---|
| 2015/0215824 A1 | 7/2015 | Nigam et al. | |
| 2018/0317137 A1* | 11/2018 | Loehr | H04L 1/1614 |
| 2019/0150045 A1 | 5/2019 | Li et al. | |
| 2019/0268815 A1* | 8/2019 | Zhu | H04W 36/0033 |
| 2020/0022046 A1 | 1/2020 | Wang et al. | |

FOREIGN PATENT DOCUMENTS

| | | | | |
|---|---|---|---|---|
| CN | 103428788 A | | 12/2013 | |
| CN | 105981438 A | | 9/2016 | |
| CN | 106162730 A | | 11/2016 | |
| CN | 107809778 A | | 3/2018 | |
| CN | 107889172 A | | 4/2018 | |
| EP | 3592037 A1 | * | 1/2020 | .......... H04W 12/037 |
| WO | 2018010187 A1 | | 1/2018 | |
| WO | 2018044693 A1 | | 3/2018 | |
| WO | 2018059299 A1 | | 4/2018 | |
| WO | 2018171738 A1 | | 9/2018 | |
| WO | WO-2019210813 A1 | * | 11/2019 | .......... H04B 7/0413 |

OTHER PUBLICATIONS

Partial Supplementary European Search Report from EP app. No. 19865837.9, dated Nov. 9, 2021, all pages.
Extended European Patent Search Report for European Patent Application 22194869.8 issued on Dec. 18, 2022.
"Consideration on the mobility in NR," 3GPP TSG-RAN WG2 Meeting #93bis, R2-162628, Dubrovnik, Croatia, Apr. 11-15, 2016, all pages.
"Discussion on the support of MBB and RACH-less in NR," 3GPP TSG-RAN WG2 NR Ad hoc 0118, R2-1800436 (revision of R2-1712603), Vancouver, Canada, Jan. 22-Jan. 26, 2018, source: ZTE, Sanechips, all pages.
"0 ms interruption support during handover procedure in NR," 3GPP TSG-RAN WG2 NRAH#1801 on NR, R2-1801019 (Resubmission of R2-1713402), Vancouver, Canada, Jan. 22-Jan. 26, 2018, Agenda Item: 10.2.7, Source: Ericsson, all pages.
First Office Action and Search Report from CN app. No. 201811142462.1, dated Oct. 9, 2020, with English translation from Global Dossier, all pages.
International Search Report from PCT/CN2019/108504, dated Jan. 3, 2020, with English translation from WIPO, all pages.
Written Opinion from the International Searching Authority from PCT/CN2019/108504, dated Jan. 3, 2020, with English translation from WIPO, all pages.
International Preliminary Report on Patentability from PCT/CN2019/108504, dated Mar. 23, 2021, with English translation from WIPO, all pages.
"Consideration on RACH-less handover", R2-162517, 3GPP TSG RAN WG2 Meeting #93bis, Dubrovnik, Croatia, Apr. 11-15, 2016, all pages.
"Handover optimization in NR for Rel 15", R2-1710590, 3GPP TSG RAN WG2 Meeting #99bis, Prague, Czech Republic, Oct. 9-13, 2017, all pages.
"BR 0ms Interruption HO", R2-1803662, 3GPP TSG-RAN WG2 Meeting #101, Athens, Greece, Feb. 26-Mar. 2, 2018, all pages.
First Office Action for Korean Patent Application 10-2021-7012417 issued on Jun. 14, 2022, and its English translation provided by Global Dossier.
"Xn Handover in NG-RAN with separated CP and UP," 3GPP TSG-RAN WG3#98, R3-174631, Reno, NV, USA, Nov. 27-Dec. 1, 2017, Agenda item: 22.2, Source: Intel Corporation, all pages.

* cited by examiner

-Prior Art-

METHODS AND APPARATUS FOR LINK HANDOVER

CROSS REFERENCE TO RELATED APPLICATIONS

This application is the U.S. national phase of PCT Application No. PCT/CN2019/108504 filed on Sep. 27, 2019, which claims a priority of the Chinese patent application No. 201811142462.1 filed on Sep. 28, 2018, the disclosures of which are incorporated herein by reference in their entireties.

TECHNICAL FIELD

The present disclosure relates to the field of wireless communication technology, in particular to a link handover method, a network entity and a terminal.

BACKGROUND

With the continuous evolution of the network, the movement events between nodes under the traditional network architecture cannot meet the higher requirements for mobile performance. As shown in FIG. 1, when a user equipment (UE) moves to a signal coverage overlap area of two network entities, the network will trigger a mobility event. In the prior art, when a mobility event is triggered, the scheme adopted in the handover process is as follows:

Solution 1: the data transmission on the original side is interrupted first, and the data transmission is performed continuously after accessing a target node, which will cause a larger data interruption.

Solution 2: after the UE receives a handover command, it still receives the data transmission from a source primary network entity. Then, when the UE performs the uplink access process, the data transmission with the source side is interrupted and at the same time, the wireless configuration of a target side is applied and the data transmission to the target side is performed, although this process will reduce a certain interruption delay, it still cannot meet the requirement of 0 ms interruption delay.

Solution 3: Multi-connected UE can connect to more than two network entities at the same time (each network entity contains at least one independent media access control (MAC) entity), there is only one primary network entity and one or more secondary network entities. The primary network entity is the network entity where the PDCP functional entity (the logical entity having the functions including security/compression/ranking) of the signaling bearer and/or data bearer is located, and is an ending point having signaling connection and/or data connection with the core network. The secondary network entity is the PDCP functional entity without signaling bearer and the ending point having the signaling connection with the core network. The secondary network entity mainly participates in data transmission, and for each bearer, it at least includes functional entities similar to radio link layer control protocol (RLC) and MAC and physical layer (segmentation/concatenation/multiplexing/scheduling/coding/modulation and other functions).

However, according to the above-mentioned prior art, at a certain moment of handover, the UE can only keep sending and receiving data with a certain network entity. In this way, when the handover process from one network entity to another network entity is performed, the data of the air interface will be interrupted, and the 0 ms delay requirement cannot be met. In addition, even with the above-mentioned multi-connectivity, there is no service interruption for the UE in a mobility event, but for a UE in multi-connectivity, once the anchor point is changed, the problem of data transmission interruption will still occur.

SUMMARY

The present disclosure provides a link handover method, a network entity, and a terminal, so as to solve the problem that 0 ms interruption cannot be achieved when a mobility event is triggered in the prior art.

An embodiment of the present disclosure provides a link handover method, which is applied to a first network entity, and the method includes, sending a first link handover instruction to a second network entity, and maintaining a first data transmission link with a terminal; receiving a link handover response fed back by the second network entity according to the first link handover instruction; sending a second link handover instruction to the terminal according to the link handover response; wherein the second link handover instruction carries radio resource control (RRC) reconfiguration information for establishing a second data transmission link between the terminal and the second network entity.

An embodiment of the present disclosure also provides a link handover method, which is applied to a second network entity, and the method includes: receiving a first link handover instruction sent by a first network entity in the process of maintaining a first data transmission link with a terminal; feeding back a link handover response to the first network entity according to the first link handover instruction, and establishing a second data transmission link with the terminal An embodiment of the present disclosure also provides a link handover method, which is applied to a terminal, and includes: receiving a second link handover instruction sent by a first network entity; establishing a second data transmission link with a second network entity according to radio resource control (RRC) reconfiguration information carried in the second link handover instruction, and maintaining a first data transmission link with the first network entity An embodiment of the present disclosure also provides a network entity, where the network entity is a first network entity and includes: a first sending module, configured to send a first link handover instruction to a second network entity and maintain a first data transmission link with a terminal; a first receiving module, configured to receive a link handover response fed back by the second network entity according to the first link handover instruction; and a second sending module, configured to send a second link handover instruction to the terminal according to the link handover response; wherein the second link handover instruction carries radio resource control (RRC) reconfiguration information for establishing a second data transmission link between the terminal and the second network entity An embodiment of the present disclosure also provides a network entity, where the network entity is a second network entity and includes: a third receiving module, configured to receive a first link handover instruction sent by a first network entity in the process of maintaining a first data transmission link with a terminal; a third sending module, configured to feed back a link handover response to the first network entity according to the first link handover instruction, and establish a second data transmission link with the terminal An embodiment of the present disclosure also provides a terminal, including: a fifth receiving module, configured to receive a second link handover instruction sent by a first network entity; a link establishment module, configured to establish a second data transmission link with a second network entity according to radio resource control (RRC) reconfiguration information carried in the second link handover instruction, and maintain a first data transmission link with the first network entity An embodiment of the present disclosure also provides a network entity, the network entity is a first network entity, including a first transceiver; a first memory, and a first processor, and program stored on the first memory and executed by the first processor, the first transceiver is configured to: send a first link handover instruction to a second network entity, and maintain a first data transmission link with a terminal; receive a link handover response fed back by the second network entity according to the first link handover instruction; send a second link handover instruction to the terminal according to the link handover response; wherein the second link handover instruction carries radio resource control (RRC) reconfiguration information for establishing a second data transmission link between the terminal and the second network entity.

An embodiment of the present disclosure also provides a network entity, the network entity is a second network entity, including a second transceiver, a second memory, a second processor, and program stored on the second memory and executed by the second processor, the second transceiver is configured to: receive a first link handover instruction sent by a first network entity in the process of maintaining a first data transmission link with a terminal; feed back a link handover response to the first network entity according to the first link handover instruction, and establishing a second data transmission link with the terminal.

An embodiment of the present disclosure also provides a terminal, including: a third transceiver, a third memory, a third processor, and program stored on the third memory and executed by the third processor, the third transceiver is configured to receive a second link handover instruction sent by a first network entity; the third processor is configured to establish a second data transmission link with a second network entity according to radio resource control (RRC) reconfiguration information carried in the second link handover instruction, and maintaining a first data transmission link with the first network entity.

An embodiment of the present disclosure also provides a computer-readable storage medium on which a computer program is stored, and when the computer program is executed by a processor, the steps of the above-mentioned link handover method are realized.

The beneficial effects of the above technical solutions of the present disclosure are as follows.

In the embodiments of the present disclosure, when link handover is required, while maintaining the original data transmission link between the terminal and the first network entity, a new data transmission link with the second network entity is established, and the new data transmission link is used to transmit data between the second network entity and the terminal. During the link handover process, the first network entity and the second network entity simultaneously transmit data to the terminal, so that no data interruption occurs during the handover process, which solves the problem that 0 ms interrupt cannot be achieved when the mobility event is triggered in the prior art.

DETAILED DESCRIPTION

Figure 1:
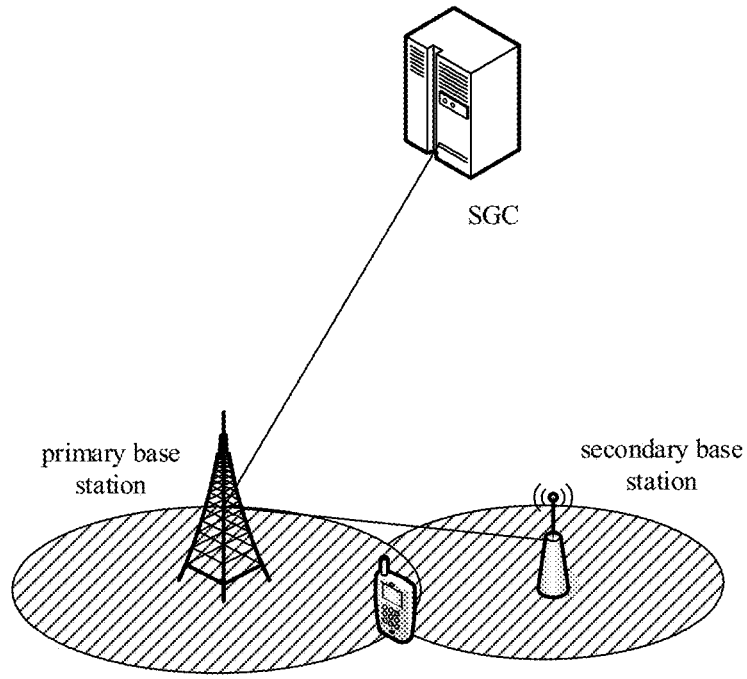
FIG. 1 shows a schematic diagram of a scenario where a mobility event occurs in the prior art.

In order to make the technical problems, technical solutions, and advantages to be solved by the present disclosure clearer, a detailed description will be given below in conjunction with the accompanying drawings and specific embodiments. In the following description, specific configurations and specific details of components are provided only to help a comprehensive understanding of the embodiments of the present disclosure. Therefore, it should be clear to those skilled in the art that various changes and modifications can be made to the embodiments described herein without departing from the scope and spirit of the present disclosure. In addition, for clarity and conciseness, descriptions of known functions and configurations are omitted.

It should be understood that "one embodiment" or "an embodiment" mentioned throughout the specification means that a specific feature, structure, or characteristic related to the embodiment is included in at least one embodiment of the present disclosure. Therefore, the appearances of "in one embodiment" or "in an embodiment" throughout the specification do not necessarily refer to the same embodiment. In addition, these specific features, structures, or characteristics can be combined in one or more embodiments in any suitable manner.

In the various embodiments of the present disclosure, it should be understood that the size of the sequence number of the following processes does not mean the order of execution. The execution order of each process should be determined by its function and internal logic, and should not limit the implementation process of embodiments of the present disclosure.

In addition, the terms "system" and "network" are often used interchangeably in this application.

In the embodiments provided in this application, it should be understood that "B corresponding to A" means that B is associated with A, and B can be determined according to A. However, it should also be understood that determining B based on A does not mean that B is determined only based on A, and B can also be determined based on A and/or other information.

In the embodiments of the present disclosure, the form of the access network is not limited, and may include Macro Base Station, Pico Base Station, Node B (3G mobile base station), enhanced base station (eNB), Femto eNB or Home eNode B or Home eNB or HeNB, relay station, access point. Remote Radio Unit (RRU), Remote Radio Head (RRH), etc. The user terminal can be a mobile phone (or cell phone), or other equipment capable of sending or receiving wireless signals, including user equipment, personal digital assistants (PDA), wireless modems, wireless communication devices, handheld devices, laptop computers, cordless phones, Wireless Local Loop (WLL) station. Customer Premise Equipment (CPE, customer terminal) that can convert mobile signals into WiFi signals, or mobile smart hotspots, smart home appliances, or other devices that can spontaneously communicate with mobile communication networks without human operation.

Specifically, the embodiments of the present disclosure provide a link handover method, a network entity, and a terminal, which solves the problem that the 0 ms interrupt cannot be achieved when a mobility event is triggered in the prior art.

The First Embodiment

Figure 2:
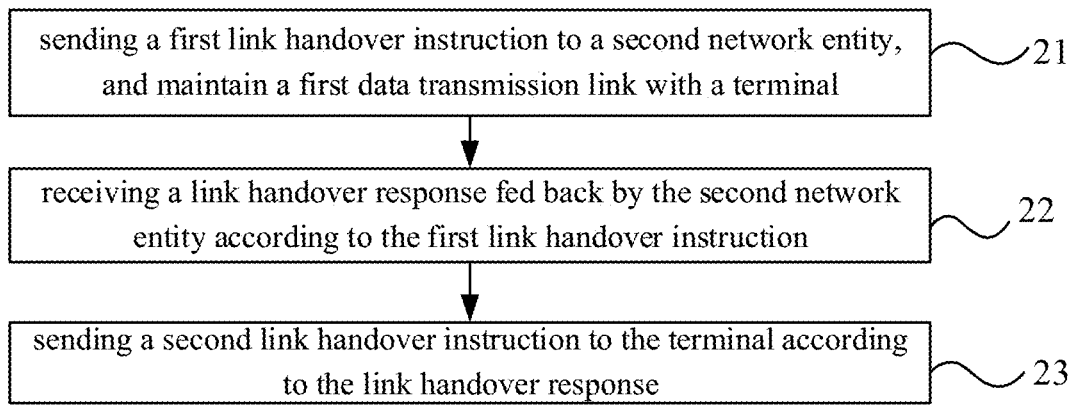
FIG. 2 shows a schematic flowchart of a link handover method according to the first embodiment of the present disclosure.

As shown in FIG. 2, the embodiment of the present disclosure provides a link handover method, which is applied to a first network entity, and specifically includes the following steps 21-23.

Step 21: sending a first link handover instruction to a second network entity, and maintain a first data transmission link with a terminal.

The first network entity is a source network entity that has established a first data transmission link with the terminal. The second network entity is a target network entity to which the terminal needs to be handed over. In the process of link handover, the first data transmission link is always maintained between the first network entity and the terminal. Wherein, a data packet sent by the first network entity through the first data transmission link is encrypted by using an old security context, and the data packet received from the first data transmission link is decrypted by using the old security context.

Step 22: receiving a link handover response fed back by the second network entity according to the first link handover instruction.

Step 23: sending a second link handover instruction to the terminal according to the link handover response.

The second link handover instruction carries radio resource control (RRC) reconfiguration information, which is used to establish a second data transmission link between the terminal and the second network entity. After the second data transmission link between the second network entity and the terminal has been established, the second network entity performs data transmission with the terminal through the second data transmission link.

During the link handover process, data transmission is always maintained in the first data transmission link between the first network entity and the terminal, and when the second data link between the second network entity and the terminal has been established, then the first network entity and the second network entity simultaneously transmit data to the terminal, so that no data interruption occurs during the link handover process.

In addition, the data packet sent by the second network entity through the second data transmission link is encrypted using a new security context, and the data packet received from the second data transmission link is decrypted using the new security context.

In addition, the link handover method of the embodiments of the present disclosure can be applied to handover between 4G base stations, handover between 5G base stations, under the centralized unit (CU)/distributed unit (DU) architecture, handover from the source 5G base station (NR gNB) or the 4G base station (ng-eNB) connected to the 5G core network to the target NR gNB or ng-eNB, and under the 4G dual-connectivity (LTE DC) or multi-RAT dual-connectivity (EN-DC or MR-DC)) architecture, the changing process of the secondary base station (SeNB)/secondary node (SN) within the primary 4G base station (Intra-MeNB) or the primary node (Intra-MN).

Optionally, when the first network entity and the second network entity are both primary network entities, the first link handover indication carries 0 ms handover indication information for notifying the network: the link handover response carries the 0 ms handover indication information for notifying the terminal and a first radio resource configuration parameter generated after the second network entity performs radio resource configuration for the terminal; the RRC reconfiguration information includes 0 ms handover indication information for notifying the terminal and the first radio resource configuration parameter. Among them, the primary network entity here may be an eNB or an NR gNB or an ng-eNB.

That is, when the first network entity and the second network entity are both primary network entities, when link handover is required, the first network entity sends a first link handover instruction to the second network entity, where the first link handover indication carries 0 ms handover indication information for notifying the network; the second network entity configures radio resources for the terminal, generates the first radio resource configuration parameter, and then feeds back the link handover response to the first network entity according to the first link handover indication, where the link handover response carries first radio resource configuration information and 0 ms handover indication information for notifying the terminal; after receiving the link handover response, the first network entity sends a second link handover indication to the terminal, where the second link handover indication carries the 0 ms handover indication information for notifying the terminal.

When the first network entity sends the first link handover instruction to the second network entity, the process includes: the first network entity determines whether to perform a 0 ms handover to the second network entity according to the terminal capability (whether it supports the 0 ms handover), and/or radio channel conditions, and load condition thereof, a radio resource management (RRM) strategy.

Further, the link handover response further includes a first data relay address; after the step of receiving the link handover response fed back by the second network entity according to the first link handover instruction, the method further includes: sending part of data that needs to be sent to the terminal to the second network entity through the first data relay address.

After receiving the first link handover instruction sent by the first network entity, for a data radio bearer (DRB) that needs to forward data, the first data relay address needs to be provided to the second network entity. Then the first data relay address may be carried in the link handover response and sent to the first network entity. After receiving the first data relay address, the first network entity can forward part of the data that needs to be sent to the terminal to the second network entity at any time.

Further, the data sent to the second network entity through the first data relay address includes a packet data convergence protocol serial number (PDCP SN) and a corresponding packet data convergence protocol service data unit (PDCP SDU). The PDCP SN is a sequence number of the data packet ranked by the first network entity, and the PDCP SN needs to be sent to the second network entity, otherwise when the second network entity renumbers the data sent by the first network entity and sends the same to the terminal, sequence number contusion on the received data will occur at the UE side.

Optionally, when the first network entity and the second network entity are both primary network entities including a distribution unit and a centralized unit, the step of sending a first link handover instruction to the second network entity includes: sending, by a centralized unit of the first network entity, a first link handover instruction to a centralized unit of the second network entity, and the first link handover instruction carries 0 ms handover instruction information for notifying the network.

Further, the step of receiving a link handover response fed back by the second network entity according to the first link handover instruction includes: receiving, by the centralized unit of the first network entity, the link handover response fed back by the centralized unit of the second network entity according to the first link handover instruction, and the link handover response carries the 0 ms handover indication information for notifying the terminal and a second radio resource configuration parameter.

The second radio resource configuration parameter is generated after the distribution unit of the second network entity receives a first user context modification message sent by the centralized unit of the second network entity and configures radio resources for the terminal. After the distribution unit of the second network entity generates the second radio resource configuration parameter, it forwards the second radio resource configuration parameter to the centralized unit of the second network entity, and the first user context modification message carries the 0 ms handover indication information for notifying the network.

Further, the step of sending a second link handover instruction to the terminal according to the link handover response includes: sending, by the centralized unit of the first network entity, a second user equipment context modification message to the distribution unit of the first network entity, where the second user equipment context modification message carries the second radio resource configuration parameter and the 0 ms handover instruction information for notifying the terminal; sending, by the distribution unit of the first network entity, a second link handover instruction to the terminal, and the RRC reconfiguration information carried in the second link handover instruction includes the second radio resource configuration parameter and the 0 ms handover instruction information for notifying the terminal.

When the first network entity and the second network entity are both primary network entities including a distributed unit and a centralized unit, the first network entity and the second network entity are NR gNBs or ng-eNBs including a centralized unit and a distributed unit.

It can be seen from the above that when link handover is required, the centralized unit of the first network entity sends the first link handover instruction to the distribution unit of the second network entity, where the first link handover instruction carries the 0 ms handover indication information for notifying the network; the centralization unit of the second network entity sends a first user equipment context modification message to the distribution unit of the second network entity according to the first link handover indication, where the first user equipment context modification message carries the 0 ms handover indication information for notifying the network. After receiving the first user equipment context modification message, the distribution unit of the second network entity performs resource configuration for the terminal, generates a second radio resource configuration parameter, and sends the second radio resource configuration parameter and the 0 ms handover indication information for notifying the terminal to the centralized unit of the second network entity; the CU of the second network entity sends a link handover response carrying the second radio resource configuration parameters and the 0 ms handover indication information for notifying the terminal to the centralized unit of the first network entity; the centralized unit of the first network entity carries the second radio resource configuration parameter and the 0 ms handover indication information for notifying the terminal in the second user equipment context modification message and sends the same to the distribution unit of the first network entity; the distribution unit of the first network entity sends a second link handover instruction carrying RRC reconfiguration information to the terminal, where the RRC reconfiguration information includes the second radio resource configuration parameter and the 0 ms handover instruction information for notifying the terminal. Wherein, after receiving the second user equipment context modification message, the distribution unit of the first network entity further sends an acknowledge message of the second user equipment context modification message to the centralized unit of the first network entity.

When the centralized unit of the first network entity sends the first link handover instruction to the centralized unit of the second network entity, the process includes: the centralized unit of the first network entity determines whether to perform a 0 ms handover to the second network entity according to the terminal capability (whether it supports the 0 ms handover), and/or radio channel conditions, load conditions thereof, and RRM strategies.

Further, the link handover response also carries a second data relay address, and after receiving, by the centralized unit of the first network entity, the link handover response fed back by the centralized unit of the second network entity according to the first link handover instruction, the method further includes: sending, by the centralized unit of the first network entity, part of the data that needs to be sent to the terminal to the centralized unit of the second network entity through the second data relay address.

After the centralized unit of the second network entity receives the first link handover instruction sent by the centralized unit of the first network entity, it also needs to provide DRB level of data relay address mapping to the data flow for forwarding data to the centralized unit of the first network entity. Then the second data relay address may be carried in the link handover response and sent to the centralized unit of the first network entity. After receiving the second data relay address, the centralized unit of the first network entity can forward part of the data that needs to be sent to the terminal to the centralized unit of the second network entity at any time.

Further, the data sent to the centralized unit of the second network entity through the second data relay address includes the PDCP SN and the corresponding PDCP SDU. The PDCP SN is the sequence number of the data packet ranking by the first network entity, and the PDCP SN needs to be sent to the second network entity, otherwise when the second network entity renumbers the data sent by the first network entity and sends the data to the terminal, sequence number confusion on the received data will occur at the terminal side.

Optionally, when the first network entity and the second network entity are both secondary network entities, the step of sending a first link handover instruction to the second network entity includes: sending, by a primary network entity corresponding to the first network entity, a first link handover instruction to the second network entity, where the first link handover instruction carries 0 ms handover instruction information for notifying the network.

Further, the step of receiving the link handover response fed back by the second network entity according to the first link handover instruction includes: receiving, by the primary network entity corresponding to the first network entity, the link handover response sent by the second network entity after receiving the first link handover instruction and performing radio resource configuration for the terminal, the link handover response carries a third radio resource configuration parameter and the 0 ms handover indication information for notifying the terminal, and the third radio resource configuration parameter is generated after the second network entity performs radio resource configuration for the terminal.

Further, the step of sending a second link handover instruction to the terminal according to the link handover response includes: sending, by the primary network entity corresponding to the first network entity, a second link handover instruction to the terminal according to the link handover response, and the RRC reconfiguration information carried in the second link handover instruction includes the third radio resource configuration parameter and the 0 ms handover indication information for notifying the terminal.

Wherein, when the first network entity and the second network entity are both secondary network entities, the first network entity and the second network entity are SeNB or SN under the LTE DC or EN-DC (MR-DC) architecture. The primary network entity corresponding to the first network entity is MeNB or MN.

It can be seen from the above that when link handover is required, the primary network entity sends a first link handover instruction to the second network entity; wherein the first link handover instruction carries 0 ms handover instruction information for notifying the network. After receiving the first link handover instruction, the second network entity performs radio resource configuration for the terminal, generates a third radio resource configuration parameter, and then carries the third radio resource configuration parameter and the 0 ms handover instruction information for notifying the terminal in the link handover response and sends the same to the primary network entity; the primary network entity sends a second link handover instruction to the terminal, where the second link handover instruction carries RRC reconfiguration information, and the RRC reconfiguration information includes the third radio resource configuration parameter and the 0 ms handover indication information for notifying the terminal.

Further, the link handover response also carries a third data relay address, and after the step of receiving, by the primary network entity corresponding to the first network entity, the link handover response sent by the second network entity after the second network entity performs the radio resource configuration for the terminal after receiving the first link handover instruction, the method further includes: receiving, by the first network entity, the third data relay address and the 0 ms handover indication information for notifying the network sent by the primary network entity corresponding to the first network entity; sending, by the first network entity, part of the data that needs to be sent to the terminal to the second network entity through the third data relay address.

After receiving the first link handover instruction sent by the primary network entity, the second network entity also needs to provide a third data relay address to the second network entity for the DRB bearer for forwarding data. Then the third data relay address can be carried in the link handover response and sent to the primary network entity. Then, the primary network entity forwards the same to the first network entity. Wherein, after receiving the first data relay address, the first network entity can forward part of the data that needs to be sent to the terminal to the second network entity at any time.

Further, the data sent to the second network entity through the third data relay address includes the PDCP SN and the corresponding PDCP SDU. Among them, the PDCP SN is the sequence number of the data packet ranking by the first network entity, and the PDCP SN needs to be sent to the second network entity, otherwise when the second network entity renumbers the data sent by the first network entity and sends the same to the terminal, sequence number confusion on the received data will occur at the terminal side.

Optionally, the method according to the embodiments of the present disclosure further include: receiving a link release instruction sent by the second network entity after the second data transmission link is established; releasing the first data transmission link and the radio resource configuration on the first network entity side according to the link release instruction.

That is, after the second data transmission link has been established, data transmission between the second network entity and the terminal can be carried out through the second data transmission link, and the first data transmission link between the first network entity and the terminal can be released.

Further, when the first network entity and the second network entity are both primary network entities including a distribution unit and a centralized unit, the step of receiving a link release instruction sent by the second network entity a after the second data transmission link has been established includes: receiving, by a centralized unit of the first network entity, the link release instruction sent by the centralized unit of the second network entity after the second data transmission link has been established.

Further, when the first network entity and the second network entity are both secondary network entities, the step of receiving the link release instruction sent by the second network entity after the second data transmission link has been established includes: receiving the link release instruction sent by the primary network entity corresponding to the first network entity after the second data transmission link has been established.

Optionally, before or after the step of receiving the link release indication sent by the second network entity after the second data transmission link has been established, the method further includes: sending a packet data convergence protocol serial number (SN) state report to the second network entity. The SN state report includes information about data that is not successfully sent to the terminal.

The release of the first data transmission link may be triggered by the first network entity, or the release of the first data transmission link may be triggered by the second network entity. When the release of the first data transmission link is triggered by the first network entity, the step of sending the SN state report to the second network entity occurs before the step of receiving the link release instruction sent by the primary network entity corresponding to the first network entity after the second data transmission link has been established. When the release of the first data transmission link is triggered by the second network entity, the step of sending the SN state report to the second network entity occurs after the step of receiving the link release instruction sent by the primary network entity corresponding to the first network entity after the second data transmission link has been established.

When the first network entity and the second network entity are both primary network entities including a distribution unit and a centralized unit, the step of sending an SN state report to the second network entity includes: when data transmission between the distribution unit of the first network entity and the terminal stops, sending, by the distribution unit of the first network entity, uplink data transmission state information to the centralized unit of the first network entity; sending, by the centralized unit of the first network entity, the SN state report to the centralized unit of the second network entity according to the uplink data transmission state information.

When the first network entity and the second network entity are secondary network entities, the step of sending an SN state report to the second network entity includes: when the data transmission between the first network entity and the terminal is stopped, sending, by the first network entity, the SN state report to the primary network entity corresponding to the first network entity, and forwarding, by the primary entity corresponding to the first network entity, the SN state report to the second network entity.

Second Embodiment

Figure 3:
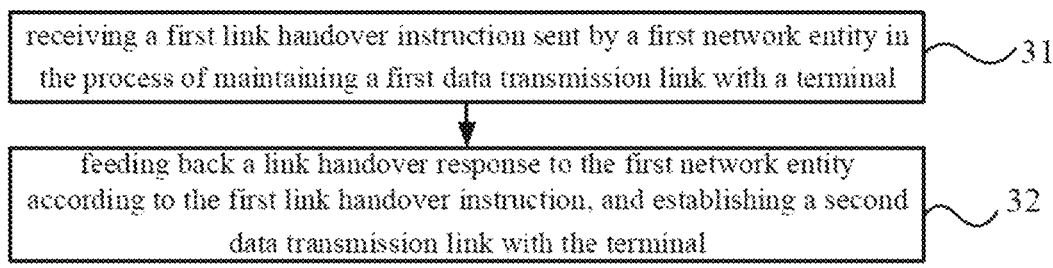
FIG. 3 shows a schematic flowchart of a link handover method according to a second embodiment of the present disclosure.

As shown in FIG. 3, the second embodiment of the present disclosure provides a link handover method, which is applied to a second network entity, and specifically includes the following steps 31 and 32.

Step 31: receiving a first link handover instruction sent by a first network entity in the process of maintaining a first data transmission link with a terminal.

The first network entity is a source network entity that has established a first data transmission link with the terminal. The second network entity is a target network entity to which the terminal needs to be handed over. In the process of link handover, the first data transmission link is always maintained between the first network entity and the terminal. Wherein, a data packet sent by the first network entity through the first data transmission link is encrypted by using an old security context, and the data packet received from the first data transmission link is decrypted by using the old security context.

Step 32: feeding back a link handover response to the first network entity according to the first link handover instruction, and establishing a second data transmission link with the terminal.

After the second data transmission link between the second network entity and the terminal has been established, the second network entity performs data transmission with the terminal through the second data transmission link.

During the link handover process, data transmission is always maintained in the first data transmission link between the first network entity and the terminal, and when the second data link between the second network entity and the terminal has been established, then the first network entity and the second network entity simultaneously transmit data to the terminal, so that no data interruption occurs during the link handover process.

In addition, the data packet sent by the second network entity through the second data transmission link is encrypted using a new security context, and the data packet received from the second data transmission link is decrypted using the new security context.

In addition, the link handover method of the embodiments of the present disclosure can be applied to handover between 4G base stations, handover between 5G base stations, under the CU/DU architecture, handover from the source NR gNB or ng-eNB to the target NR gNB or ng-eNB, and under LTE DC or EN-DC (MR-DC) architecture, the changing process of SeNB/SN of Intra-MeNB or Intra-MN.

Optionally, when the first network entity and the second network entity are both primary network entities, the first link handover indication carries 0 ms handover indication information used for notifying the network.

The step of feeding back a link handover response to the first network entity according to the first link handover instruction includes: performing radio resource configuration for the terminal, and generating a first radio resource configuration parameter; feeding back a link handover response to the first network entity according to the first link handover instruction, wherein the link handover response carries 0 ms handover indication information for notifying the terminal and the first radio resource configuration parameter. Among them, the primary network entity may be eNB or NR gNB or ng-eNB.

That is, when the first network entity and the second network entity are both primary network entities, when link handover is required, the first network entity sends a first link handover instruction to the second network entity, where the first link handover indication carries 0 ms handover indication information for notifying the network; the second network entity configures radio resources for the terminal, generates the first radio resource configuration parameter, and then feeds back the link handover response to the first network entity according to the first link handover indication, where the link handover response carries first radio resource configuration information and 0 ms handover indication information for notifying the terminal; after receiving the link handover response, the first network entity sends a second link handover indication to the terminal, where the second link handover indication carries the 0 ms handover indication information for notifying the terminal.

Further, the link handover response further includes a first data relay address, and after the step of feeding back the link handover response to the first network entity according to the first link handover instruction, the method further includes: receiving first data sent by the first network entity through the first data relay address, where the first data is part of the data that the first network entity needs to send to the terminal.

After receiving the first link handover instruction sent by the first network entity, for a data radio bearer (DRB) that needs to forward data, the first data relay address needs to be provided to the second network entity. Then the first data relay address may be carried in the link handover response and sent to the first network entity. After receiving the first data relay address, the first network entity can forward part of the data that needs to be sent to the terminal to the second network entity at any time.

Further, the data sent to the second network entity through the first data relay address includes PDCP SN and corresponding PDCP SDU. The PDCP SN is a sequence number of the data packet ranked by the first network entity, and the PDCP SN needs to be sent to the second network entity, otherwise when the second network entity renumbers the data sent by the first network entity and sends the same to the terminal, sequence number confusion on the received data will occur at the UE side.

Optionally, when the first network entity and the second network entity are both primary network entities including a distribution unit and a centralized unit, the step of receiving the first link handover instruction sent by the first network entity in the process of maintaining the first data transmission link with the terminal includes: receiving, by the centralized unit of the second network entity, the first link handover instruction sent by the centralized unit of the first network entity in the process of maintaining the first data transmission link with the terminal, and the first link handover instruction carries 0 ms handover instruction information for notifying the network.

Further, the step of feeding back a link handover response to the first network entity according to the first link handover instruction includes: sending, by the centralized unit of the second network entity, a first user context modification message to the distribution unit of the second network entity according to the first link handover instruction, and the first user context modification message carries the 0 ms handover indication information for notifying the network; performing, by the distribution unit of the second network entity, radio resource configuration for the terminal, generating a second radio resource configuration parameter, and feeding back the second radio resource configuration parameter and the 0 ms handover indication information for notifying the terminal to the centralized unit of the second network entity; feeding back, by the centralized unit of the second network entity, a link handover response to the centralized unit of the first network entity, and the link handover response carries 0 ms handover indication information for notifying the terminal and the second radio resource configuration parameter.

When the first network entity and the second network entity are both primary network entities including a distributed unit and a centralized unit, the first network entity and the second network entity are NR gNBs or ng-eNBs including a centralized unit and a distributed unit.

It can be seen from the above that when link handover is required, the centralized unit of the first network entity sends the first link handover instruction to the distribution unit of the second network entity, where the first link handover instruction carries the 0 ms handover indication information for notifying the network, the centralization unit of the second network entity sends a first user equipment context modification message to the distribution unit of the second network entity according to the first link handover indication, where the first user equipment context modification message carries the 0 ms handover indication information for notifying the network. After receiving the first user equipment context modification message, the distribution unit of the second network entity performs resource configuration for the terminal, generates a second radio resource configuration parameter, and sends the second radio resource configuration parameter and the 0 ms handover indication information for notifying the terminal to the centralized unit of the second network entity; the CU of the second network entity sends a link handover response carrying the second radio resource configuration parameter and the 0 ms handover indication information for notifying the terminal to the centralized unit of the first network entity, the centralized unit of the first network entity carries the second radio resource configuration parameter and the 0 ms handover indication information for notifying the terminal in the second user equipment context modification message and sends the same to the distribution unit of the first network entity; the distribution unit of the first network entity sends a second link handover instruction carrying RRC reconfiguration information to the terminal, where the RRC reconfiguration information includes the second radio resource configuration parameter and the 0 ms handover instruction information for notifying the terminal. Wherein, after receiving the second user equipment context modification message, the distribution unit of the first network entity further sends an acknowledge message of the second user equipment context modification message to the centralized unit of the first network entity.

Further, the link handover response also carries a second data relay address, and after the step of feeding back, by the central unit of the second network entity, the link handover response to the central unit of the first network entity, the method further includes: receiving, by the centralized unit of the second network entity, second data sent by the centralized unit of the first network entity through the second data relay address, the first data being part of data that the centralized unit of the first network entity needs to send to the terminal.

After the centralized unit of the second network entity receives the first link handover instruction sent by the centralized unit of the first network entity, it also needs to provide DRB level of data relay address mapping to the data flow for forwarding data to the centralized runt of the first network entity. Then the second data relay address may be carried in the link handover response and sent to the centralized unit of the first network entity. After receiving the second data relay address, the centralized unit of the first network entity can forward part of the data that needs to be sent to the terminal to the centralized unit of the second network entity at any time.

Further, the data sent by the centralized unit of the first network entity received by the centralized unit of the second network entity through the second data relay address includes the PDCP SN and the corresponding PDCP SDU. The PDCP SN is the sequence number of the data packet ranking by the first network entity, and the PDCP SN needs to be sent to the second network entity, otherwise when the second network entity renumbers the data sent by the first network entity and sends the data to the terminal, sequence number confusion on the received data will occur at the terminal side.

Optionally, when the first network entity and the second network entity are both secondary network entities, the step of receiving the first link handover instruction sent by the first network entity in the process of maintaining the first data transmission link with the terminal includes: receiving a first link handover instruction sent by the primary network entity corresponding to the first network entity in the process of maintaining the first data transmission link between the first network entity and the terminal, the first link handover instruction carries 0 ms handover instruction information for notifying the network.

Further, the step of feeding back a link handover response to the first network entity according to the first link handover instruction includes: performing radio resource configuration for the terminal, and generating a third radio resource configuration parameter; feeding back the link handover response to the primary network entity corresponding to the first network entity according to the first link handover instruction, and the link handover response carries 0 ms handover instruction information for notifying the terminal and the third radio resource configuration parameter.

Wherein, when the first network entity and the second network entity are both secondary network entities, the first network entity and the second network entity are SeNB or SN under the LTE DC or EN-DC (MR-DC) architecture. The primary network entity corresponding to the first network entity is MeNB or MN.

It can b seen from the above that when link handover is required, the primary network entity sends a first link handover instruction to the second network entity; wherein the first link handover instruction carries 0 ms handover instruction information for notifying the network. After receiving the first link handover instruction, the second network entity performs radio resource configuration for the terminal, generates a third radio resource configuration parameter, and then carries the third radio resource configuration parameter and the 0 ms handover instruction information for notifying the terminal in the link handover response and sends the same to the primary network entity; the primary network entity sends a second link handover instruction to the terminal, where the second link handover instruction carries RRC reconfiguration information, and the RRC reconfiguration information includes the third radio resource configuration parameter and the 0 handover indication information for notifying the terminal.

Further, the link handover response also carries a third data relay address, and after the step of feeding back the link handover response to the primary network entity corresponding to the first network entity according to the first link handover instruction, the method further includes: receiving third data sent by the first network entity through the third data relay address received by the first network, where the third data is part of the data that the first network entity needs to send to the terminal.

Wherein, after receiving the link handover response, the primary network entity corresponding to the first network entity sends the third data relay address and the 0 ms handover instruction information for notifying the network to the first network entity.

After receiving the first link handover instruction sent by the primary network entity, the second network entity also needs to provide a third data relay address to the second network entity for the DRB bearer for forwarding data. Then the third data relay address can be carried in the link handover response and sent to the primary network entity. Then, the primary network entity forwards the same to the first network entity. Wherein, after receiving the first data relay address, the first network entity can forward part of the data that needs to be sent to the terminal to the second network entity at any time.

Further, the data sent to the second network entity through the third data relay address includes the PDCP SN and the corresponding PDCP SDU. Among them, the PDCP SN is the sequence number of the data packet ranking by the first network entity, and the PDCP SN needs to be sent to the second network entity, otherwise when the second network entity renumbers the data sent by the first network entity and sends the same to the terminal, sequence number confusion on the received data will occur at the terminal side.

Optionally, the method further includes: sending a link release instruction to the first network entity, so that the first network entity releases the first data transmission link and the radio resource configuration on the first network entity side.

That is, after the second data transmission link has been established, data transmission between the second network entity and the terminal can be carried out through the second data transmission link, and the first data transmission link between the first network entity and the terminal can be released.

Further, the step of sending a link release instruction to the first network entity includes: when a preset condition is met, sending a link release instruction to the first network entity.

The preset condition includes one or more of: successfully sending a first data packet to the terminal, a preset timer reaching a timing time, and successfully sending release indication information to the terminal.

When the first network entity and the second network entity are both primary network entities including a distribution unit and a centralized unit, and the preset condition is met, the step of sending the link release instruction to the first network entity includes: when the preset condition is met, sending, by the centralized unit of the second network entity, a link release instruction to the centralized unit of the first network entity.

When the first network entity and the second network entity are both secondary network entities, the step of sending a link release instruction to the first network entity when the preset condition is met includes: when the preset condition is met, sending preset indication information to the primary network entity corresponding to the first network entity; wherein the preset indication information is used to instruct the primary network entity corresponding to the first network entity to send the link release instruction to the first network entity.

Optionally, before or after the step of sending a link release instruction to the first network entity, the method further includes: receiving a SN state report sent by the first network entity. The SN state report includes information about data that is not successfully sent to the terminal.

The release of the first data transmission link may be triggered by the first network entity, or the release of the first data transmission link may be triggered by the second network entity. When the release of the first data transmission link is triggered by the first network entity, the step of receiving the SN state report sent by the first network entity occurs before the step of sending a link release instruction to the first network entity; when the release of the first data transmission link is triggered by the second network entity, the step of receiving the SN state report sent by the first network entity occurs after the step of sending a link release instruction to the first network entity.

When the first network entity and the second network entity are both primary network entities including a distribution unit and a centralized unit, the step of receiving the SN state report sent by the first network entity includes: receiving, by the centralized unit of the second network entity, a SN state report sent by the centralized unit of the first network entity according to the received uplink data transmission status information, wherein the uplink data transmission state information received by the centralized unit of the first network entity is sent by the distribution unit of the first network entity when data transmission with the terminal is stopped.

When the first network entity and the second network entity are both secondary network entities, the step of receiving the SN state report sent by the first network entity includes: receiving, by the second network entity, the SN state report sent by the primary network entity corresponding to the first network entity, where the SN state report sent by the primary network entity corresponding to the first network entity is sent by the first network entity to the primary network entity corresponding to the first network entity when the data transmission between the first network entity and the terminal stops.

The Third Embodiment

Figure 4:
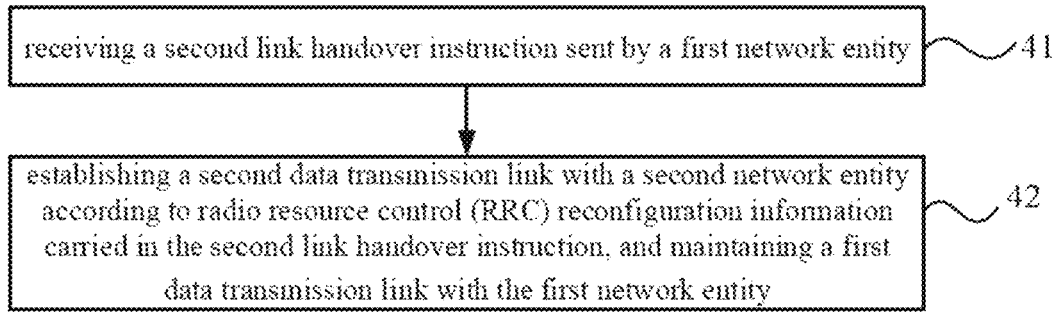
FIG. 4 shows a schematic flowchart of a link handover method according to a third embodiment of the present disclosure.

As shown in FIG. 4, the third embodiment of the present disclosure provides a link handover method, which specifically includes the following steps.

Step 41: receiving a second link handover instruction sent by a first network entity.

Step 42: establishing a second data transmission link with a second network entity according to radio resource control (RRC) reconfiguration information carried in the second link handover instruction, and maintaining a first data transmission link with the first network entity.

The first network entity is a source network entity that has established a first data transmission link with the terminal. The second network entity is a target network entity to which the terminal needs to be handed over. In the process of link handover, the first data transmission link is always maintained between the first network entity and the terminal. Wherein, a data packet sent by the first network entity through the first data transmission link is encrypted by using an old security context, and the data packet received from the first data transmission link is decrypted by using the old security context.

After the second data transmission link between the second network entity and the terminal has been established, the second network entity performs data transmission between the second network entity and the terminal through the second data transmission link.

During the link handover process, data transmission is always maintained in the first data transmission link between the first network entity and the terminal, and when the second data link between the second network entity and the terminal has been established, then the first network entity and the second network entity simultaneously transmit data to the terminal, so that no data interruption occurs during the link handover process.

In addition, the data packet sent by the second network entity through the second data transmission link is encrypted using a new security context, and the data packet received from the second data transmission link is decrypted using the new security context.

In addition, the link handover method of the embodiments of the present disclosure can be applied to handover between 4G base stations, handover between 5G base stations, under the CU/DU architecture, handover from the source NR gNB or ng-eNB to the target NR gNB or ng-eNB, and under LTE DC or EN-DC (MR-DC) architecture, the changing process of SeNB/SN of Intra-MeNB or Intra-MN.

Optionally, when the first network entity and the second network entity are both primary network entities, the RRC reconfiguration information carried in the second link handover instruction includes an 0 ms handover instruction for notifying the terminal and a first radio resource configuration parameter, where the first radio resource configuration parameter is generated after the second network entity performs radio resource configuration for the terminal. Among them, the primary network entity here may be eNB or NR gNB or ng-eNB.

That is, when the first network entity and the second network entity are both primary network entities, when link handover is required, the first network entity sends a first link handover instruction to the second network entity, where the first link handover indication carries 0 ms handover indication information for notifying the network; the second network entity configures radio resources for the terminal, generates the first radio resource configuration parameter, and then feeds back the link handover response to the first network entity according to the first link handover indication, where the link handover response carries first radio resource configuration information and 0 ms handover indication information for notifying the terminal; after receiving the link handover response, the first network entity sends a second link handover indication to the terminal, where the second link handover indication carries the 0 ms handover indication information for notifying the terminal.

Optionally, when the first network entity and the second network entity are both primary network entities including a distribution unit and a centralized unit, the step of receiving a second link handover instruction sent by the first network entity includes: receiving a second link handover instruction sent by a distribution unit of the first network entity, where the RRC reconfiguration information carried in the second link handover instruction includes a second radio resource configuration parameter and 0 ms handover indication information for notifying the terminal, where the second radio resource configuration parameter is generated after the distribution unit of the second network entity performs resource configuration for the terminal.

When the first network entity and the second network entity are both primary network entities including a distributed unit and a centralized unit, the first network entity and the second network entity are NR gNBs or ng-eNBs including a centralized unit and a distributed unit.

It can be seen from the above that when link handover is required, the centralized unit of the first network entity sends the first link handover instruction to the distribution unit of the second network entity, where the first link handover instruction carries the 0 ms handover indication information for notifying the network; the centralization unit of the second network entity sends a first user equipment context modification message to the distribution unit of the second network entity according to the first link handover indication, where the first user equipment context modification message carries the 0 ms handover indication information for notifying the network. After receiving the first user equipment context modification message, the distribution unit of the second network entity performs resource configuration for the terminal, generates a second radio resource configuration parameter, and sends the second radio resource configuration parameter and the 0 ms handover indication information for notifying the terminal to the centralized unit of the second network entity; the CU of the second network entity sends a link handover response carrying the second radio resource configuration parameter and the 0 ms handover indication information for notifying the terminal to the centralized unit of the first network entity; the centralized unit of the first network entity carries the second radio resource configuration parameter and the 0 ms handover indication information for notifying the terminal in the second user equipment context modification message and sends the same to the distribution unit of the first network entity; the distribution unit of the first network entity sends a second link handover instruction carrying RRC reconfiguration information to the terminal, where the RRC reconfiguration information includes the second radio resource configuration parameter and the 0 ms handover instruction information for notifying the terminal. Wherein, after receiving the second user equipment context modification message, the distribution unit of the first network entity fiuther sends an acknowledge message of the second user equipment context modification message to the centralized unit of the first network entity.

Optionally, when the first network entity and the second network entity are both secondary network entities, the step of receiving a second link handover instruction sent by the first network entity includes: receiving a second link handover instruction sent by the primary network entity corresponding to the first network entity, where the RRC reconfiguration information carried in the second link handover instruction includes a third radio resource configuration parameter and 0 ms handover indication information for notifying the terminal, where the third radio resource configuration parameter is generated after the second network entity performs resource configuration for the terminal.

Wherein, when the first network entity and the second network entity are both secondary network entities, the first network entity and the second network entity are SeNB or SN under the LTE DC or EN-DC (MR-DC) architecture. The primary network entity corresponding to the first network entity is MeNB or MN.

It can be seen from the above that when link handover is required, the primary network entity sends a first link handover instruction to the second network entity, wherein the first link handover instruction carries 0 ms handover instruction information for notifying the network. After receiving the first link handover instruction, the second network entity performs radio resource configuration for the terminal, generates a third radio resource configuration parameter, and then carries the third radio resource configuration parameter and the 0 ms handover instruction information for notifying the terminal in the link handover response and sends the same to the primary network entity, the primary network entity sends a second link handover instruction to the terminal, where the second link handover instruction carries RRC reconfiguration information, and the RRC reconfiguration information includes the third radio resource configuration parameter and the 0 ms handover indication information for notifying the terminal.

In summary, when the link handover method of the embodiment of the present disclosure is specifically implemented, the interaction process among the first network entity, the second network entity, and the terminal may be as shown in the following implementation.

Figure 5:
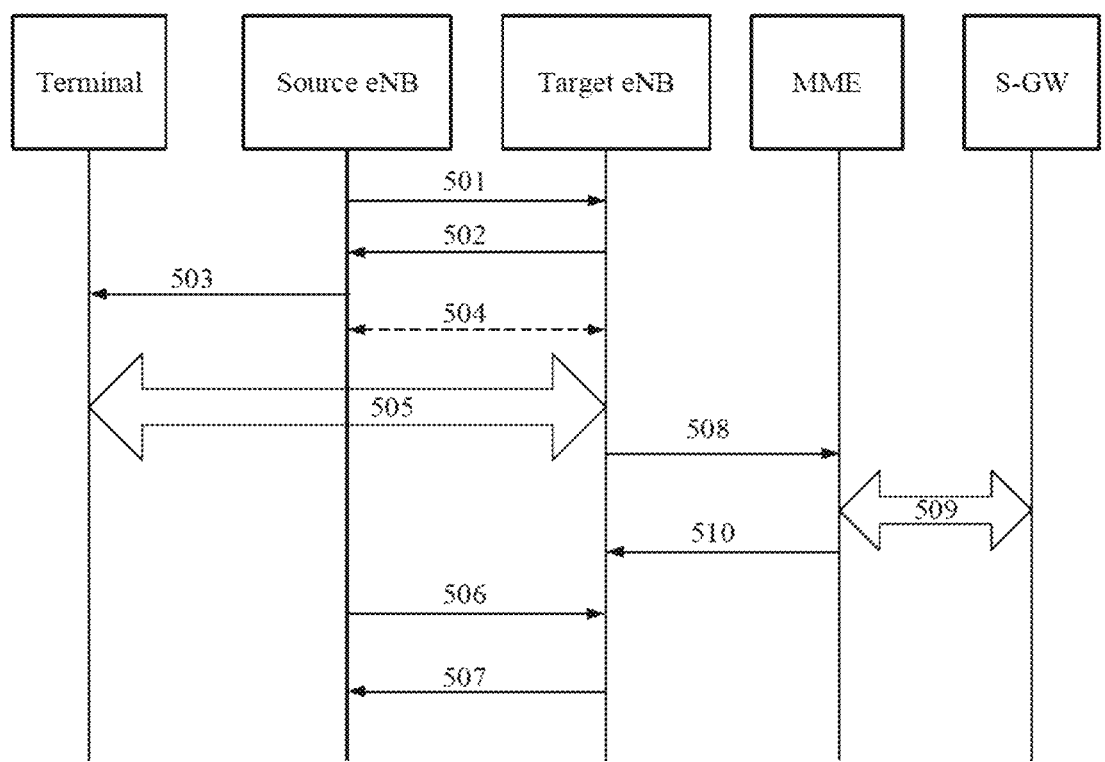
FIG. 5 shows a flow chart of a specific implementation manner of interaction between the first network entity, the second network entity, and the terminal of the present disclosure.

Implementation 1: the first network entity and the second network entity are both eNBs in the 4G network, and the first network entity is the source primary network entity, and the second network entity is the target primary network entity. The specific interaction process is shown in FIG. 5.

Step 501: the source primary network entity determines whether to perform 0 ms handover to the target primary network entity according to terminal capabilities (whether it supports 0 ms handover), and/or radio channel conditions, the load conditions, and an RRM strategy. When the source primary network entity determines to perform the 0 ms handover, it sends a handover request message (that is, a first link handover instruction) to the target primary network entity. Wherein, the handover request message (that is, the first link handover indication) carries 0 ms handover indication information for notifying the network.

Step 502: the target primary network entity performs admission control, performs radio resource configuration for the terminal, generates a radio resource configuration parameter, and then transmits the radio resource configuration parameter and the 0 ms handover indication information for notifying the terminal to the source primary network entity in the form of an RRC container. In addition, the target primary network entity will provide a data relay address to the source primary network entity for the DRB bearer that needs to forward data. That is, the target primary network entity sends an RRC reconfiguration message (i.e., link handover response) to the source primary network entity, where the RRC reconfiguration message (i.e., link handover response) carries the radio resource configuration parameter and is used to notify the terminal of the 0 ms handover instruction information and data relay address.

Step 503: the source primary network entity transmits the received RRC reconfiguration message to the terminal (that is, sends a second link handover instruction to the terminal). At the same time, the source primary network entity continues to use the old security context to encrypt/decrypt uplink and downlink data packets transmitted between the source primary network entity and the terminal.

Step 504: after receiving the data relay address, the source primary network entity can forward part of the data that needs to be sent to the terminal to the target primary network entity at any time. Among them, each forwarded data must include the PDCP SN and the corresponding PDCP SDU.

Step 505: the terminal performs uplink access to the target primary network entity according to the radio resource configuration parameter carried in the received RRC reconfiguration message, and transmits an RRC reconfiguration complete message to the target primary network entity at the same time.

After receiving the RRC reconfiguration complete message from the terminal, the target primary network entity interacts with a core network in a high layer to perform a path handover operation. The specific path handover operation is similar to the path handover operation after the traditional X2 handover. For example, steps 508~510.

At the same time, the target primary network entity uses the new security context to encrypt/decrypt the uplink and downlink data packets transmitted between the target primary network entity and the terminal.

Step 506: once the source primary network entity decides to stop data transmission, it sends a SN state report to the target primary network entity to inform the target primary network entity which data has not been successfully sent to the terminal.

Step 507: the target primary network entity sends a user equipment context release message to the source primary network entity when the preset condition is met, so that the source primary network entity releases the original data transmission link with the terminal and the corresponding resource configuration. Wherein, the preset conditions include one or more of the target primary network entity successfully sending a first data packet to the terminal, the preset timer reaching the timing time, and the target primary network entity successfully sending release indication information to the terminal.

It should be noted that the release of the original data link can be triggered by the source primary network entity or the target primary network entity. When the release of the original data link is triggered by the source primary network entity, step 507 occurs after step 506; when the release of the original data link is triggered by the target primary network entity, step 506 occurs after step 507.

In addition, steps 508 to 510 of the path handover operation are as follows.

Step 508: the target primary network entity sends a path handover request to a mobility management entity (MME).

Step 509: the MME interacts with a serving gateway (S-GW) to modify the bearer.

Step 510: after the modification of the bearer is completed, the MME returns a path handover request response message to the target primary network entity.

It can be seen from the above that during the handover, the source primary network entity and the target primary network entity simultaneously transmit data to the terminal. The data packet sent by the source primary network entity uses the old security context for encryption/decryption, and the data packet transmitted by the target primary network entity uses the new security context for encryption/decryption.

Figure 6:
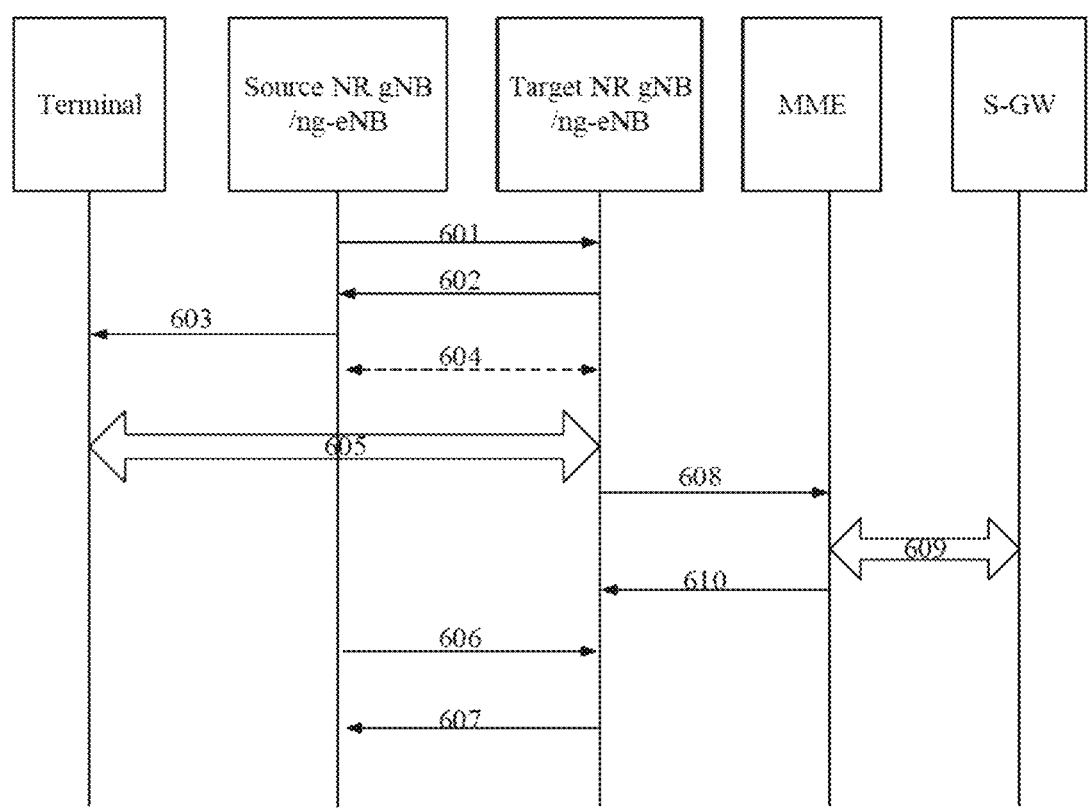
FIG. 6 shows another flow chart of the specific implementation manner of interaction between the first network entity, the second network entity and the terminal of the present disclosure.

Implementation 2: the first network entity and the second network entity are both NR gNB or ng-eNB in the 5G network, and the first network entity is the source primary network entity, and the second network entity is the target primary network entity. The specific interaction process is shown in FIG. 6.

Step 601: the source primary network entity determines whether to perform 0 ms handover to the target primary network entity according to terminal capabilities (whether it supports 0 ms handover), and/or radio channel conditions, the load conditions, and an RRM strategy. When the source primary network entity determines to perform the 0 ms handover, it sends a handover request message (that is, a first link handover instruction) to the target primary network entity. Wherein, the handover request message (that is, the first link handover indication) carries 0 ms handover indication information for notifying the network.

Step 602: the target primary network entity performs admission control, performs radio resource configuration for the terminal, generates a radio resource configuration parameter, and then transmits the radio resource configuration parameter and the 0 ms handover indication information for notifying the terminal to the source primary network entity in the form of an RRC container. In addition, the target primary network entity provides the DRB-level data relay address mapped to a flow for forwarding data (optionally, it should be ensured that the mapping of the flow to the DRB does not change after the handover) to the source primary network entity. That is, the target primary network entity sends an RRC reconfiguration message (i.e., a link handover response) to the source primary network entity, where the RRC reconfiguration message (i.e., the link handover response) carries a radio resource configuration parameter, the 0 ms handover instruction information for notifying the terminal, and data relay address.

Step 603: the source primary network entity transmits the received RRC reconfiguration message to the terminal (that is, sends a second link handover instruction to the terminal). At the same time, the source primary network entity continues to use the old security context to encrypt/decrypt uplink and downlink data packets transmitted between the source primary network entity and the terminal.

Step 604: after receiving the data relay address, the source primary network entity can forward part of the data that needs to be sent to the terminal to the target primary network entity at any time. Among them, each forwarded data must include the PDCP SN and the corresponding PDCP SDU.

Step 605: the terminal performs uplink access to the target primary network entity according to the radio resource configuration parameter carried in the received RRC reconfiguration message, and transmits an RRC reconfiguration complete message to the target primary network entity at the same time.

After receiving the RRC reconfiguration complete message from the terminal, the target primary network entity interacts with a core network in a high layer to perform a path handover operation. The specific path handover operation is similar to the path handover operation after the traditional X2 handover. For example, steps 609-611.

At the same time, the target primary network entity uses the new security context to encrypt/decrypt the uplink and downlink data packets transmitted between the target primary network entity and the terminal.

Step 606: once the source primary network entity decides to stop data transmission, it sends a SN state report to the target primary network entity to inform the target primary network entity which data has not been successfully sent to the terminal.

Step 607: the target primary network entity sends a user equipment context release message to the source primary network entity when the preset condition is met, so that the source primary network entity releases the original data transmission link with the terminal and the corresponding resource configuration. Wherein, the preset conditions include one or more of the target primary network entity successfully sending a first data packet to the terminal, the preset timer reaching the timing time, and the target primary network entity successfully sending release indication information to the terminal.

It should be noted that the release of the original data link can be triggered by the source primary network entity or the target primary network entity. When the release of the original data link is triggered by the source primary network entity, step 607 occurs after step 606, when the release of the original data link is triggered by the target primary network entity, step 606 occurs after step 607.

In addition, steps 608 to 610 of the path handover operation are as follows.

Step 608: the target primary network entity sends a path handover request to the MME.

Step 609: the MME interacts with the S-GW to modify the bearer.

Step 610: after the modification of the bearer is completed, the MME returns a path handover request response message to the S-GW.

It can be seen from the above that during the handover, the source primary network entity and the target primary network entity simultaneously transmit data to the terminal. The data packet sent by the source primary network entity uses the old security context for encryption/decryption, and the data packet transmitted by the target primary network entity uses the new security context for encryption/decryption.

Figure 7:
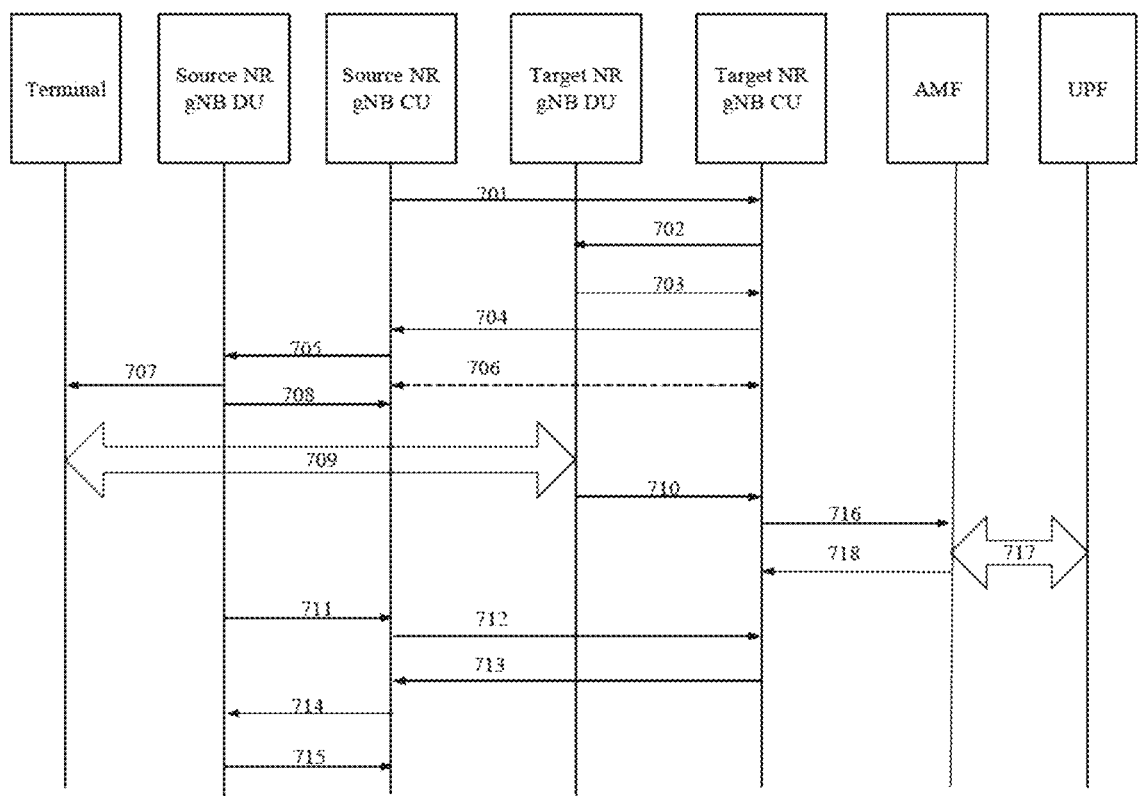
FIG. 7 shows yet another flow chart of the specific implementation manner of interaction between the first network entity, the second network entity and the terminal of the present disclosure.

Implementation 3: the first network entity and the second network entity are NR gNB or ng-eNB under the CU/DU architecture, and the first network entity is the source primary network entity, and the second network entity is the target primary network entity. The specific interaction process is shown in FIG. 7.

Step 701: the centralized unit of the source primary network entity determines whether to perform 0 ms handover to the centralized unit of the target primary network entity according to terminal capabilities (whether it supports 0 ms handover), and/or radio channel conditions, the load conditions, and an RRM strategy. When the centralized unit of the source primary network entity determines to perform the 0 ms handover, it sends a handover request message (that is, a first link handover instruction) to the centralized unit of the target primary network entity. Wherein, the handover request message (that is, the first link handover indication) carries 0 ms handover indication information for notifying the network.

Step 702: the centralized unit of the target primary network entity sends a user equipment context modification request message to the distribution unit of the target primary network entity. Optionally, the message carries 0 ms handover indication information for notifying the network.

Step 703: after the distribution unit of the target primary network entity receives the user equipment context modification message, it performs admission control and configures radio resources for the terminal, and then transmits a radio resource configuration parameter to the centralized unit of the target primary network entity through the RRC container. Optionally, the RRC container may also include 0 ms handover indication information for notifying the terminal.

Step 704: the centralized unit of the target primary network entity generates a corresponding RRC reconfiguration message (i.e., link handover response), and feeds it back to the centralized unit of the source primary network entity. The RRC reconfiguration message (that is, the link handover response) includes the 0 ms handover indication information for notifying the terminal, the radio configuration parameter, and the data relay address. The data relay address is the DRB-level data relay address mapped to a flow for forwarding data (optionally, it should be ensured that the mapping of the flow to the DRB does not change after the handover).

Step 705: the centralized unit of the source primary network entity includes the received RRC reconfiguration message in the user equipment context modification message in the form of a container, and sends it to the distribution unit of the source primary network entity. At the same time, the centralized unit of the source primary network entity continues to use the old security context to encrypt/decrypt the uplink and downlink data packets transmitted between the centralized unit of the source primary network entity and the terminal.

Step 706: after receiving the data relay address, the centralized unit of the source primary network entity can forward part of the data that needs to be sent to the terminal to the centralized unit of the target primary network entity at any time. Each forwarded data must include the PDCP SN and the corresponding PDCP SDU.

Step 707: the distribution unit of the source primary network entity transmits the received RRC reconfiguration message (that is, the second link handover instruction) to the terminal. At the same time, the distribution unit of the source primary network entity continues to maintain data transmission with the terminal.

Step 708: the distribution unit of the source primary network entity returns a user equipment context modification continuation message to the centralized unit of the source primary network entity.

Step 709: the terminal performs uplink access to the distribution unit of the target primary network entity according to the radio resource configuration parameter carried in the received RRC reconfiguration message, and at the same time transmits an RRC reconfiguration complete message to the distribution unit of the target primary network entity.

Step 710: the distribution unit of the target primary network entity transmits transmits the RRC reconfiguration complete message to the centralized unit of the target primary network entity through an uplink RRC transmission message.

After receiving the RRC reconfiguration complete message from the terminal, the centralized unit of the target primary network entity interacts with a core network in a high layer to perform a path handover operation. The specific path handover operation is similar to the path handover operation after the traditional X2 handover. For example, steps 716-718.

At the same time, the centralized unit of the target primary network entity uses the new security context to encrypt/decrypt the uplink and downlink data packets transmitted between the centralized unit of the target primary network entity and the terminal.

Step 711: once the distribution unit of the source primary network entity decides to stop data transmission, it will send an uplink data transmission state (DDDS) message to the centralized unit of the source primary network entity.

Step 712: the centralized unit of the source primary network entity sends an SN state report to the centralized unit of the target primary network entity to inform the centralized unit of the target primary network entity which data has not been successfully sent to the terminal.

Step 713: the centralized unit of the target primary network entity sends a user equipment context release message to the centralized unit of the source primary network entity when the preset conditions are met, so that the centralized unit of the source primary network entity releases the original data transmission link with the terminal and the corresponding resource configuration. Wherein, the preset conditions include one or more of the target primary network entity successfully sending the first data packet to the terminal, the preset timer reaching the timing time, and the target primary network entity successfully sending release indication information to the terminal.

Step 714: the centralized unit of the source primary network entity sends a user equipment context release message to the DU unit of the source primary network entity, so that the distribution unit of the source primary network entity releases the original data transmission link with the terminal and the corresponding resource configuration.

Step 715: the distribution unit of the source primary network entity returns a user equipment table context release response message to the centralized unit of the target primary network entity.

It should be noted that the release of the original data link can be triggered by the source primary network entity or the target primary network entity. When the release of the original data link is triggered by the source primary network entity, the execution sequence of steps 711 to 715 is: steps 711, 712, 713, 714, 715; when the release of the original data link is triggered by the target primary network entity, the execution sequence of steps 711 to 715 is: step 713, 714, 715, 711, 712.

In addition, steps 716 to 718 of the path handover operation are as follows.

Step 716: the centralized unit of the target primary network entity sends a path handover request to an access and mobility management entity (AMF).

Step 717: the AMF interacts with the user plane function entity (UPF) to modify the bearer.

Step 718: after the modification of the bearer is completed, the AMF returns a path handover request response message to the centralized unit of the target primary network entity.

It can be seen from the above that dining the handover, the source primary network entity and the target primary network entity simultaneously transmit data to the terminal. The data packet sent by the source primary network entity uses the old security context for encryption/decryption, and the data packet transmitted by the target primary network entity uses the new security context for encryption/decryption.

Figure 8:
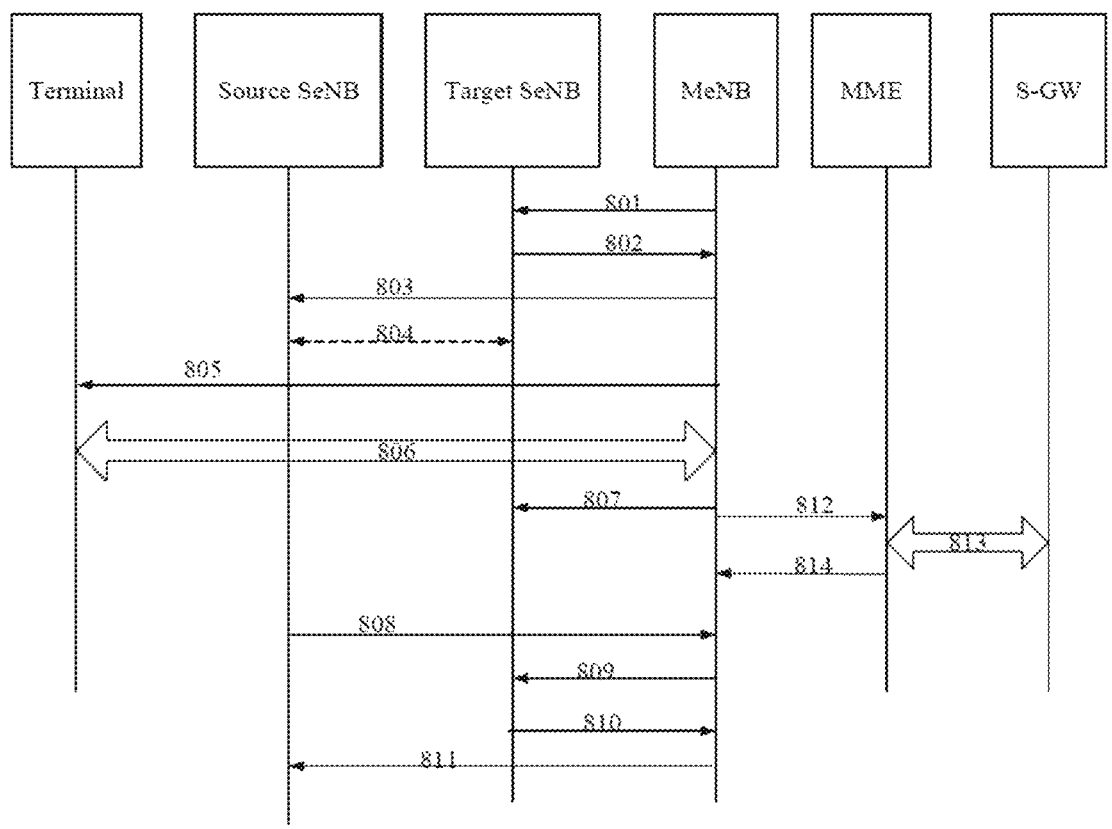
FIG. 8 shows still yet another flow chart of the specific implementation manner of the interaction between the first network entity, the second network entity and the terminal of the present disclosure.

Implementation 4: under the LTE DC or EN-DC (MR-DC) architecture, the SeNB/SN change process of the Intra-MeNB or Intra-MN. Among them, the source secondary network entity (i.e., the first network entity) is SeNB or SN, the target secondary network entity (i.e., the second network entity) is SeNB or SN, and the primary network entity is (MeNB or MN). The specific interaction process is shown in FIG. 8.

Step 801: the primary network entity determines whether to perform 0 ms handover to the target secondary network entity according to the terminal capability (whether it supports 0 ms handover), and/or radio channel conditions, the load conditions, and the RRM strategy. When the primary network entity determines to perform the 0 ms handover, it sends a SeNB addition message (that is, the first link handover indication) to the target secondary network entity, and the message carries the 0 ms handover indication information for notifying the network.

Step 802: The target secondary network entity performs admission control, performs resource configuration for the terminal, generates a corresponding radio resource configuration parameter, and then transmits the radio resource configuration parameter and the 0 ms handover indication information for notifying the terminal to the primary network entity in the form of an RRC container. In addition, the target secondary network entity will provide the data relay address to the primary network entity for the DRB bearer that needs to forward data. That is, the target secondary network entity sends the SeNB addition message response message (that is, the link handover response) to the primary network entity, where the SeNB addition message response message (that is, the link handover response) carries radio resource configuration parameter, the 0 ms handover instruction information for notifying the terminal, and data relay address.

Step 803: the primary network entity sends a SeNB release message to the source secondary network entity, and the message contains 0 ms handover indication information for notifying the network and data relay address. At the same time, the source secondary network entity continues to use the old security context to encrypt/decrypt the uplink and downlink data packets transmitted between the source primary network entity and the terminal.

Step 804: after receiving the relay address, the source secondary network entity can forward part of the data that needs to be sent to the terminal to the target secondary network entity at any time. Each forwarded data must include the PDCP SN and the corresponding PDCP SDU.

Step 805: the primary network entity sends an RRC reconfiguration message to the terminal, where the RRC reconfiguration message carries radio resource configuration and the 0 ms handover indication information for notifying the terminal.

Step 806: the terminal performs uplink access to the target secondary network entity according to the radio resource configuration parameter carried in the received RRC reconfiguration message, and transmits an RRC reconfiguration complete message to the primary network entity at the same time.

Step 807: the primary network entity sends the RRC reconfiguration complete message to the target secondary network entity, and at the same time, interacts with the core network in the high layer to perform a path handover operation. The specific path handover operation is similar to the path handover operation after the traditional X2 handover. For example, steps 812-814.

In addition, the target secondary network entity uses the new security context to encrypt/decrypt the uplink and downlink data packets transmitted between the target primary network entity and the terminal.

Steps 808-809: once the source secondary network entity decides to stop data transmission, it will send the SN state report to the primary network entity, and the primary network entity will forward it to the target secondary network entity to inform the target primary network entity which data was not successfully sent to the terminal.

Step 810: when the preset condition is met, the target secondary network entity sends prompt information for prompting it to send the user equipment context release message to the primary network entity. Wherein, the preset conditions include one or more of the target primary network entity successfully sending the first data packet to the terminal, the preset timer reaching the timing time, and the target primary network entity success hilly sending release indication information to the terminal.

Step 811: the primary network entity sends a user equipment context release message to the source secondary network entity, so that the source secondary network entity releases the original data transmission link with the terminal and the corresponding resource configuration.

It should be noted that the release of the original data link can be triggered by the source secondary network entity or the target secondary network entity. When the release of the original data link is triggered by the source secondary network entity, the execution sequence of steps 808 to 811 is: steps 808, 809, 810, 811; when the release of the original data link is triggered by the target secondary network entity, the execution sequence of steps 808 to 811 is: steps 810, 811, 808, 809.

In addition, steps 812 to 814 of the path handover operation are as follows.

Step 812: the primary network entity sends a path handover request to the MME.

Step 813: the MME interacts with the S-GW to modify the bearer.

Step 814: alter the modification of the bearer is completed, the MME returns a path handover request response message to the primary network entity.

It can be seen from the above that during the handover, the source secondary network entity and the target secondary network entity simultaneously transmit data to the terminal. The data packets sent by the source secondary network entity are encrypted/decrypted using the old security context, while the data packets transmitted by the target secondary network entity are encrypted/decrypted using the new security context.

Fourth Embodiment

Figure 9:
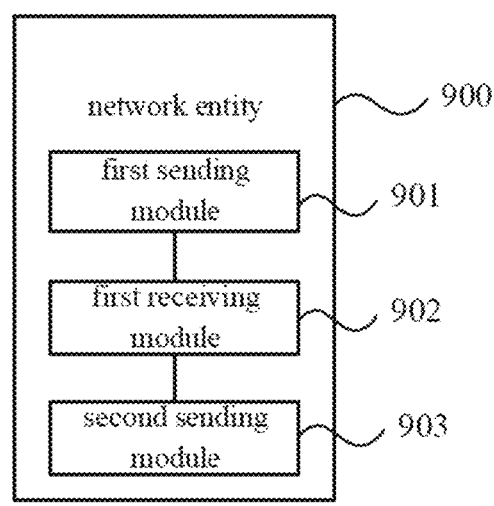
FIG. 9 shows a schematic diagram of modules of a network entity-according to a fourth embodiment of the present disclosure.

As shown in FIG. 9, an embodiment of the present disclosure provides a network entity 900. The network entity 900 is a first network entity and includes the following functional modules: a first sending module 901, configured to send a first link handover instruction to a second network entity and maintain a first data transmission link with a terminal; a first receiving module 902, configured to receive a link handover response fed back by the second network entity according to the first link handover instruction; and a second sending module 903, configured to send a second link handover instruction to the terminal according to the link handover response; wherein the second link handover instruction carries radio resource control (RRC) reconfiguration information for establishing a second data transmission link between the terminal and the second network entity.

Optionally, the first network entity further includes: a second receiving module, configured to receive a link release instruction sent by the second network entity after the second data transmission link is established; and a release module, configured to release the first data transmission link and the radio resource configuration on the first network entity side according to the link release instruction.

Optionally, when the first network entity and the second network entity are both primary network entities, the first link handover indication carries 0 ms handover indication information for notifying the network; the link handover response carries the 0 ms handover indication information for notifying the terminal and a first radio resource configuration parameter generated after the second network entity performs radio resource configuration for the terminal; the RRC reconfiguration information includes 0 ms handover indication information for notifying the terminal and the first radio resource configuration parameter.

Optionally, the link handover response further includes a first data relay address; the network entity further includes, a first relay module, configured to send part of data that needs to be sent to the terminal to the second network entity through the first data relay address.

Optionally, when the first network entity and the second network entity are both primary network entities including a distribution unit and a centralized unit, when the first sending module 901 is sending the first link handover instruction to the second network entity, it is specifically used to: control the centralized unit of the first network entity to send a first link handover instruction to the centralized unit of the second network entity, where the first link handover instruction carries 0 ms handover instruction information for notifying a network.

Optionally, the first receiving module 902 is specifically configured to: control the centralized unit of the first network entity to receive a link handover response fed back by the centralized unit of the second network entity according to the first link handover instruction, and the link handover response carries 0 ms handover indication information for notifying the terminal and a second radio resource configuration parameter.

The second radio resource configuration parameter is generated after the distribution unit of the second network entity receives a first user context modification message sent by the centralized unit of the second network entity and configures radio resources for the terminal. After the distribution unit of the second network entity generates the second radio resource configuration parameter, it forwards the second radio resource configuration parameter to the centralized unit of the second network entity, and the first user context modification message carries the 0 ms handover indication information for notifying the network.

Optionally, the second sending module 903 is specifically configured to: control the centralized unit of the first network entity to send a second user equipment context modification message to the distribution unit of the first network entity, where the second user equipment context modification message carries the second radio resource configuration parameter and 0 ms handover indication information for notifying the terminal; control the distribution unit of the first network entity to send a second link handover instruction to the terminal, and the RRC reconfiguration information carried in the second link handover instruction includes the second radio resource configuration parameter and the 0 ms handover instruction information for notifying the terminal.

Optionally, the link handover response also carries a second data relay address, and the network entity further includes: a second relay module, configured to control the centralized unit of the first network entity to send part of the data that needs to be sent to the terminal to the centralized unit of the second network entity through the second data relay address.

Optionally, when the first network entity and the second network entity are both secondary network entities, when the first sending module 901 is sending the first link handover instruction to the second network entity, it specifically configured to: control the primary network entity corresponding to the first network entity to send the first link handover instruction to the second network entity, where the first link handover instruction carries the 0 ms handover instruction information for notifying the network.

Optionally, the first receiving module 902 is specifically configured to: control the primary network entity corresponding to the first network entity to receive the link handover response sent by the second network entity after receiving the first link handover instruction and performing radio resource configuration for the terminal, the link handover response carries a third radio resource configuration parameter and the 0 ms handover indication information for notifying the terminal, and the third radio resource configuration parameter is generated after the second network entity performs radio resource configuration for the terminal.

Optionally, the second sending module 903 is specifically configured to: control the primary network entity corresponding to the first network entity to send a second link handover instruction to the terminal according to the link handover response, and the RRC reconfiguration information carried in the second link handover instruction includes the third radio resource configuration parameter and 0 ms handover indication information for notifying the terminal.

Optionally, the link handover response also carries a third data relay address, and the network entity further includes: a relay address receiving module, configured to receive the third data relay address and the 0 ms handover indication information for notifying the network from the primary network entity corresponding to the first network entity, and a third relay module, configured to send part of the data that needs to be sent to the terminal to the second network entity through the third data relay address.

Optionally, when the first network entity and the second network entity are both primary network entities including a distribution unit and a centralized unit, the second receiving module is specifically configured to: control the centralized unit of the first network entity to receive a link release instruction sent by the centralized unit of the second network entity after the second data transmission link is established.

Optionally, when the first network entity and the second network entity are both secondary network entities, the second receiving module is specifically configured to: receive the link release instruction sent by the primary network entity corresponding to the first network entity after the second data transmission link is established.

Optionally, the first network entity also includes: a report sending module, configured to send an SN state report to the second network entity, wherein, the SN state report includes information about data that is not successfully sent to the terminal.

Optionally, when the first network entity and the second network entity are both primary network entities including a distribution unit and a centralized unit, the report sending module is specifically configured to: when data transmission between the distribution unit of the first network entity and the terminal is stopped, control the distribution unit of the first network entity to send uplink data transmission state information to the centralized unit of the first network entity; control the centralized unit of the first network entity to send the SN state report to the centralized unit of the second network entity according to the uplink data transmission state information.

Optionally, when the first network entity and the second network entity are secondary network entities, the report sending module is specifically configured to: when the data transmission between the first network entity and the terminal is stopped, send the SN state report to the primary network entity corresponding to the first network entity, and forwarding, by the primary network entity corresponding to the first network entity, the SN state report to the second network entity.

The embodiment of the network entity of the present disclosure corresponds to the embodiment of the foregoing method, and all the implementation means in the foregoing method are applicable to the embodiment of the network entity, and the same technical effect can also be achieved.

Fifth Embodiment

Figure 10:
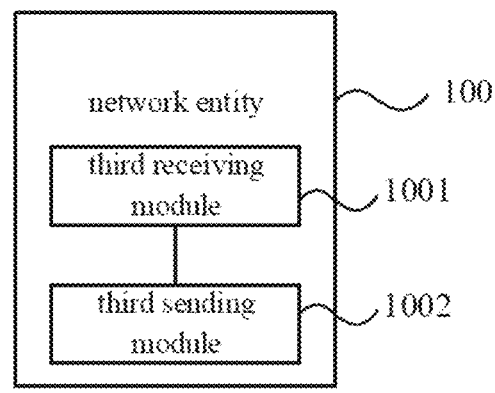
FIG. 10 shows a schematic diagram of modules of a network entity according to a fifth embodiment of the present disclosure.

As shown in FIG. 10, an embodiment of the present disclosure provides a network entity 100. The network entity 100 is a second network entity and includes the following functional modules: a third receiving module 1001, configured to receive a first link handover instruction sent by a first network entity in the process of maintaining a first data transmission link with a terminal; a third sending module 1002, configured to feed back a link handover response to the first network entity according to the first link handover instruction, and establish a second data transmission link with the terminal.

Optionally, the second network entity also includes: a fourth sending module, configured to send a link release instruction to the first network entity, so that the first network entity releases the first data transmission link and radio resource configuration on the first network entity side.

Optionally, the second network entity also includes: a fourth receiving module, configured to receive a SN state report sent by the first network entity; wherein the SN state report includes information about data that is not successfully sent to the terminal.

Optionally, when the first network entity and the second network entity are both primary network entities, the first link handover indication carries 0 ms handover indication information for notifying the network.

When the third sending module 1002 feeds back a link handover response to the first network entity according to the first link handover instruction, it is specifically configured to: perform radio resource configuration for the terminal, and generate a first radio resource configuration parameter; feed back a link handover response to the first network entity according to the first link handover instruction, wherein the link handover response carries the 0 ms handover indication information for notifying the terminal and the first radio resource configuration parameter.

Optionally, the link handover response further includes a first data relay address, and the network entity further includes: a first relay data receiving module, configured to receive first data sent by the first network entity through the first data relay address, where the first data is part of data that the first network entity needs to send to the terminal.

Optionally, when the first network entity and the second network entity are both primary network entities including a distribution unit and a centralized unit, the third receiving module 1001 is specifically configured to: control the centralized unit of the second network entity to receive the first link handover instruction sent by the centralized unit of the first network entity in the process of maintaining the first data transmission link with the terminal, and the first link handover instruction carries the 0 ms handover instruction information for notifying the network.

Optionally, when the third sending module 1002 feeds back a link handover response to the first network entity according to the first link handover instruction, it is specifically configured to: control the centralized unit of the second network entity to send a first user context modification message to the distribution unit of the second network entity according to the first link handover instruction, and the first user context modification message carries the 0 ms handover indication information for notifying the network; control the distribution unit of the second network entity to performs radio resource configuration for the terminal, generate a second radio resource configuration parameter, and feed back the second radio resource configuration parameter and the 0 ms handover indication information for notifying the terminal to the centralized unit of the second network entity; and control the central unit of the second network entity to feed back a link handover response to the central unit of the first network entity, and the link handover response carries the 0 ms handover indication information for notifying the terminal and the second radio resource configuration parameter.

Optionally, the link handover response also carries a second data relay address, and the network entity further includes: a second relay data receiving module, configured to control the centralized unit of the second network entity to receive second data sent by the centralized unit of the first network entity through the second data relay address, and the first data is part of the data that the centralized unit of the first network entity needs to send to the terminal.

Optionally, when the first network entity and the second network entity are both secondary network entities, the third receiving module 1001 is specifically configured to: receive a first link handover instruction sent by the primary network entity corresponding to the first network entity in the process of maintaining the first data transmission link between the first network entity and the terminal, the first link handover instruction carries 0 ms handover instruction information for notifying the network.

Optionally, when the third sending module 1002 feeds back a link handover response to the first network entity according to the first link handover instruction, it is specifically configured to: perform radio resource configuration for the terminal, and generate a third radio resource configuration parameter; feed back the link handover response to the primary network entity corresponding to the first network entity according to the first link handover instruction, and the link handover response carries 0 ms handover instruction information for notifying the terminal and the third radio resource configuration parameter.

Optionally, the link handover response further carries a third data relay address, and the network entity further includes: a third relay data receiving module, configured to receive third data sent by the first network entity through the third data relay address received by the first network, where the third data is part of the data that the first network entity needs to send to the terminal.

Wherein, after receiving the link handover response, the primary network entity corresponding to the first network entity sends the third data relay address and the 0 ms handover instruction information for notifying the network to the first network entity.

Optionally, the fourth sending module includes: a release instruction sending unit, configured to send a link release instruction to the first network entity when a preset condition is met;

The preset condition includes one or more of: successfully sending a first data packet to the terminal, a preset timer reaching a timing time, and successfully sending release indication information to the terminal.

Optionally, when the first network entity and the second network entity are both primary network entities including a distribution unit and a centralized unit, the release indication sending unit is specifically configured to: when the preset condition is met, control the centralized unit of the second network entity to send a link release instruction to the centralized unit of the first network entity.

Optionally, when the first network entity and the second network entity are both secondary network entities, the release indication sending unit is specifically configured to: when the preset condition is met, send preset instruction information to the primary network entity corresponding to the first network entity; wherein the preset indication information is used to instruct the primary network entity corresponding to the first network entity to send the link release instruction to the first network entity.

Optionally, when the first network entity and the second network entity are both primary network entities including a distribution unit and a centralized unit, the fourth receiving module is specifically configured to: control the centralized unit of the second network entity to receive a SN state report sent by the centralized unit of the first network entity according to the received uplink data transmission state information, wherein the uplink data transmission state information received by the centralized unit of the first network entity is sent by the distribution unit of the first network entity when data transmission with the terminal is stopped.

Optionally, when the first network entity and the second network entity are both secondary network entities, the fourth receiving module is specifically configured to: receive the SN state report sent by the primary network entity corresponding to the first network entity, where the SN state report sent by the primary network entity corresponding to the first network entity is sent by the first network entity to the primary network entity corresponding to the first network entity when the data transmission between the first network entity and the terminal stops.

The embodiment of the network entity of the present disclosure corresponds to the embodiment of the foregoing method and all the implementation in the foregoing method embodiment are applicable to the embodiment of the network entity, and the same technical effect can also be achieved.

Sixth Embodiment

Figure 11:
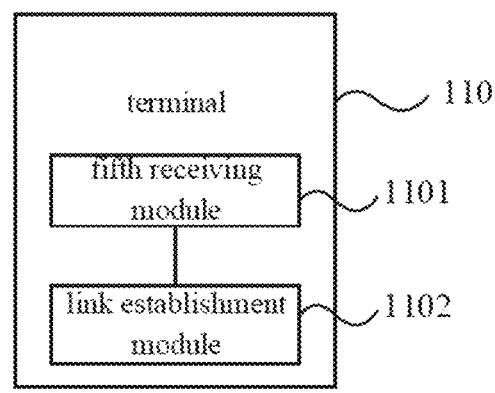
FIG. 11 shows a schematic diagram of modules of a terminal according to a sixth embodiment of the present disclosure.

As shown in FIG. 11, an embodiment of the present disclosure provides a terminal 110, which includes the following functional modules: a fifth receiving module 1101, configured to receive a second link handover instruction sent by a first network entity; a link establishment module 1102, configured to establish a second data transmission link with a second network entity according to radio resource control (RRC) reconfiguration information carried in the second link handover instruction, and maintain a first data transmission link with the first network entity.

Optionally, when the first network entity and the second network entity are both primary network entities, the RRC reconfiguration information carried in the second link handover instruction includes an 0 ms handover instruction for notifying the terminal and a first radio resource configuration parameter, where the first radio resource configuration parameter is generated after the second network entity performs radio resource configuration for the terminal.

Optionally, when the first network entity and the second network entity are both primary network entities including a distribution unit and a centralized unit, the fifth receiving module 1101 is specifically configured to: receive a second link handover instruction sent by a distribution unit of the first network entity, where the RRC reconfiguration information carried in the second link handover instruction includes a second radio resource configuration parameter and 0 ms handover indication information for notifying the terminal, where the second radio resource configuration parameter is generated after the distribution unit of the second network entity performs resource configuration for the terminal.

Optionally, when the first network entity and the second network entity are both secondary network entities, the fifth receiving module 1101 is specifically configured to: receive a second link handover instruction sent by the primary network entity corresponding to the first network entity, where the RRC reconfiguration information carried in the second link handover instruction includes a third radio resource configuration parameter and 0 ms handover indication information for notifying the terminal, where the third radio resource configuration parameter is generated after the second network entity performs resource configuration for the terminal.

The embodiment of the network entity of the present disclosure corresponds to the embodiment of the foregoing method, and all the implementation in the foregoing method embodiment are applicable to the embodiment of the network entity, and the same technical effect can also be achieved.

Seventh Embodiment

Figure 12:
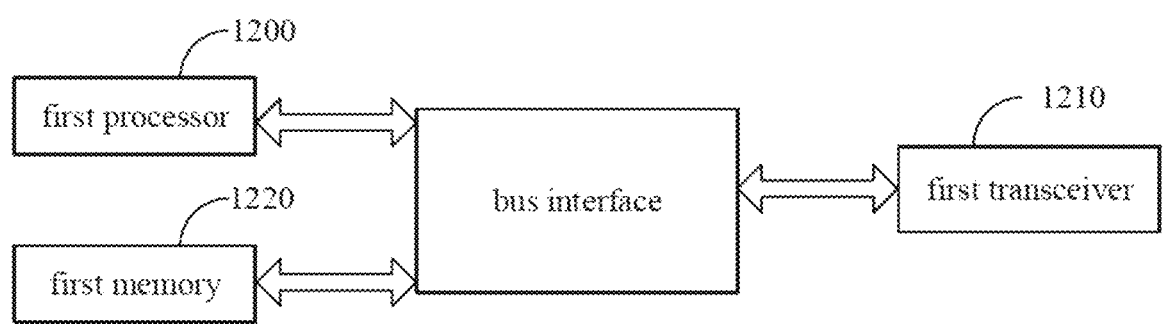
FIG. 12 shows a structural block diagram of a network entity according to a seventh embodiment of the present disclosure.

In order to better achieve the foregoing objective, as shown in FIG. 12, this embodiment provides a network entity. The network entity is a first network entity and includes: a first processor 1200; a first memory 1220 connected to the first processor 1200 through a bus interface, and a first transceiver 1210 connected to the first processor 1200 through a bus interface; the first memory 1220 is used to store programs and data used by the first processor 1200 when performing operations; send data information or pilots through the first transceiver 1210, and also receive an uplink control channel through the first transceiver 1210; when the first processor 1200 calls and executes the programs and data stored in the first memory 1220, the first transceiver 1210 is used to: send a first link handover instruction to a second network entity and maintain a first data transmission link with a terminal; receive a link handover response fed back by the second network entity according to the first link handover instruction; and send a second link handover instruction to the terminal according to the link handover response; wherein the second link handover instruction carries radio resource control (RRC) reconfiguration information for establishing a second data transmission link between the terminal and the second network entity.

Wherein, the first transceiver 1210 is also used to: receive a link release instruction sent by the second network entity after the second data transmission link is established: and release the first data transmission link and the radio resource configuration on the first network entity side according to the link release instruction.

Wherein, when the first network entity and the second network entity are both primary network entities, the first link handover indication carries 0 ms handover indication information for notifying the network; the link handover response carries the 0 ms handover indication information for notifying the terminal and a first radio resource configuration parameter generated after the second network entity performs radio resource configuration for the terminal; the RRC reconfiguration information includes 0 ms handover indication information for notifying the terminal and the first radio resource configuration parameter.

Wherein, the link handover response also includes a first data relay address, the first transceiver 1210 is also used to: send part of data that needs to be sent to the terminal to the second network entity through the first data relay address.

Wherein, when the first network entity and the second network entity are both primary network entities including a distribution unit and a centralized unit, the first transceiver 1210 is sending the first link handover instruction to the second network entity, it is specifically used to: control the centralized unit of the first network entity to send a first link handover instruction to the centralized unit of the second network entity, where the first link handover instruction carries 0 ms handover instruction information for notifying a network.

Wherein, when the first transceiver 1210 receives the link handover response fed back by the second network entity according to the first link handover instruction, it is specifically configured to: control the centralized unit of the first network entity to receive a link handover response fed back by the centralized unit of the second network entity according to the first link handover instruction, and the link handover response carries 0 ms handover indication information for notifying the terminal and a second radio resource configuration parameter.

The second radio resource configuration parameter is generated after the distribution unit of the second network entity receives a first user context modification message sent by the centralized unit of the second network entity and configures radio resources for the terminal. After the distribution unit of the second network entity generates the second radio resource configuration parameter, it forwards the second radio resource configuration parameter to the centralized unit of the second network entity, and the first user context modification message carries the 0 ms handover indication information for notifying the network.

Wherein, when the first transceiver 1210 is sending a second link handover instruction to the terminal according to the link handover response, it specifically used to: control the centralized unit of the first network entity to send a second user equipment context modification message to the distribution unit of the first network entity, where the second user equipment context modification message carries the second radio resource configuration parameter and 0 ms handover indication information for notifying the terminal; control the distribution unit of the first network entity to send a second link handover instruction to the terminal, the RRC reconfiguration information carried in the second link handover instruction includes the second radio resource configuration parameter and the 0 ms handover instruction information for notifying the terminal.

Wherein, the link handover response also carries a second data relay address, and the first transceiver 1210 is also used to: control the centralized unit of the first network entity to send part of the data that needs to be sent to the terminal to the centralized unit of the second network entity through the second data relay address.

Wherein, when the first network entity and the second network entity are both secondary network entities, the first transceiver 1210 is specifically configured to send a first link handover instruction to the second network entity, it specifically configured to: control the primary network entity corresponding to the first network entity to send the first link handover instruction to the second network entity, where the first link handover instruction carries the 0 ms handover instruction information for notifying the network.

Wherein, when the first transceiver 1210 is receiving the link handover response fed back by the second network entity according to the first link handover instruction, it is specifically configured to: control the primary network entity corresponding to the first network entity to receive the link handover response sent by the second network entity after receiving the first link handover instruction and performing radio resource configuration for the terminal, the link handover response carries a third radio resource configuration parameter and the 0 ms handover indication information for notifying the terminal, and the third radio resource configuration parameter is generated after the second network entity performs radio resource configuration for the terminal.

Wherein, when the first transceiver 1210 is sending a second link handover instruction to the terminal according to the link handover response, it is specifically used to: control the primary network entity corresponding to the first network entity to send a second link handover instruction to the terminal according to the link handover response, and the RRC reconfiguration information carried in the second link handover instruction includes the third radio resource configuration parameter and 0 ms handover indication information for notifying the terminal.

Wherein, the link handover response also carries a third data relay address, and the first transceiver 1210 is also used to: receive the third data relay address and the 0 ms handover indication information for notifying the network from the primary network entity corresponding to the first network entity; and send part of the data that needs to be sent to the terminal to the second network entity through the third data relay address.

Wherein, when the first network entity and the second network entity are both primary network entities including a distribution unit and a centralized unit, the first transceiver 1210 is receiving the link release instruction sent by the second network entity after the data transmission link is established, it is specifically used to: control the centralized unit of the first network entity to receive a link release instruction sent by the centralized unit of the second network entity after the second data transmission link is established.

Wherein, when the first network entity and the second network entity are both secondary network entities, the first transceiver 1210 receives the link release instruction sent by the second network entity after the second data transmission link is established, it is specifically used to: receive the link release instruction sent by the primary network entity corresponding to the first network entity after the second data transmission link is established.

Wherein, the first transceiver 1210 is also used to: send an SN state report to the second network entity; wherein the SN state report includes information about data that is not successfully sent to the terminal.

Wherein, when the first network entity and the second network entity are both primary network entities including a distribution unit and a centralized unit, the first transceiver 1210 sends an SN state report to the second network entity, it is specifically used to: when data transmission between the distribution unit of the first network entity and the terminal is stopped, control the distribution unit of the first network entity to send uplink data transmission state information to the centralized unit of the first network entity; control the centralized unit of the first network entity to send the SN state report to the centralized unit of the second network entity according to the uplink data transmission state information.

Wherein, when the first network entity and the second network entity are secondary network entities, the first transceiver 1210 is sending an SN state report to the second network entity, it is specifically configured to: when the data transmission between the first network entity and the terminal is stopped, send the SN state report to the primary network entity corresponding to the first network entity, and forwarding, by the primary network entity corresponding to the first network entity, the SN state report to the second network entity.

Wherein, in FIG. 12, the bus architecture may include any number of interconnected buses and bridges. Specifically, various circuits of one or more processors represented by the first processor 1200 and the memory represented by the first memory 1220 are linked together. The bus architecture can also link various other circuits such as peripheral devices, voltage regulators, power management circuits, etc., which are all known in the art, and therefore, no further description will be given herein. The bus interface provides the interface. The first transceiver 1210 may be a plurality of elements, including a transmitter and a transceiver, and provide a unit for communicating with various other devices on the transmission medium. The first processor 1200 is responsible for managing the bus architecture and general processing, and the first memory 1220 can store data used by the first processor 1200 when performing operations.

Those skilled in the art can understand that all or part of the steps in the foregoing embodiments can be implemented by hardware, or by a computer program that instructs related hardware. The computer program includes instructions for performing part or all of the steps of the foregoing method. The computer program can be stared in a readable storage medium, which can be any form of storage medium.

Eighth Embodiment

Figure 13:
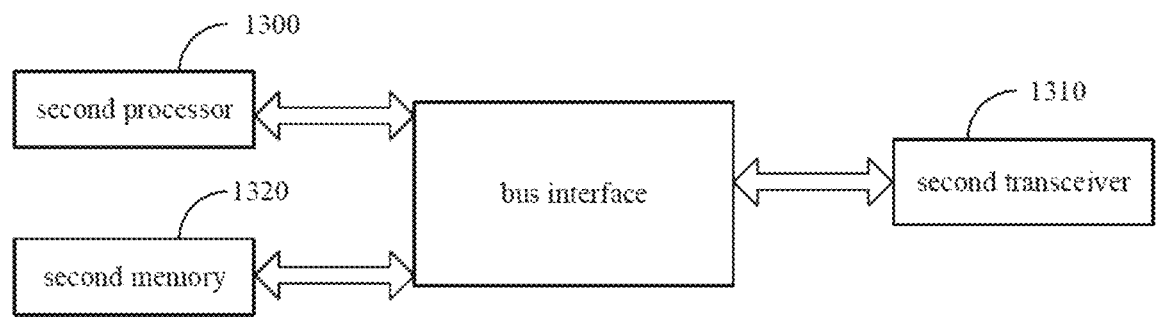
FIG. 13 shows a structural block diagram of a network entity of the eighth embodiment of the present disclosure.

In order to better achieve the foregoing objective, as shown in FIG. 13, this embodiment provides a network entity. The network entity is a second network entity and includes: a second processor 1300; a second memory 1320 connected to the second processor 1300 through a bus interface, and a second transceiver 1310 connected to the second processor 1300 through a bus interface; the second memory 1320 is used to store programs and data used by the second processor 1300 when performing operations: send data information or pilots through the second transceiver 1310, and also receive an uplink control channel through the second transceiver 1310; When the second processor 1300 calls and executes the programs and data stored in the second memory 1320, the second transceiver 1310 is used to: receive a first link handover instruction sent by a first network entity in the process of maintaining a first data transmission link with a terminal; feed back a link handover response to the first network entity according to the first link handover instruction, and establish a second data transmission link with the terminal.

Wherein, the second transceiver 1310 is also used to: send a link release instruction to the first network entity, so that the first network entity releases the first data transmission link and radio resource configuration on the first network entity side.

Wherein, the second transceiver 1310 is also used to: receive a SN state report sent by the first network entity; wherein the SN state report includes information about data that is not successfully sent to the terminal.

Wherein, when the first network entity and the second network entity are both primary network entities, the first link handover indication carries 0 ms handover indication information for notifying the network.

When the second transceiver 1310 feeds back a link handover response to the first network entity according to the first link handover instruction, it is specifically configured to: perform radio resource configuration for the terminal, and generate a first radio resource configuration parameter, feed back a link handover response to the first network entity according to the first link handover instruction, wherein the link handover response carries the 0 ms handover indication information for notifying the terminal and the first radio resource configuration parameter.

Wherein, the link handover response also includes a first data relay address, and the second transceiver 1310 is further configured to: receive first data sent by the first network entity through the first data relay address, where the first data is part of data that the first network entity needs to send to the terminal.

Wherein, when the first network entity and the second network entity are both primary network entities including a distribution unit and a centralized unit, the second transceiver 1310 is receiving the first link handover instruction sent by the first network entity in the process of maintaining the first data transmission link with the terminal, it is specifically used to: control the centralized unit of the second network entity to receive the first link handover instruction sent by the centralized unit of the first network entity in the process of maintaining the first data transmission link with the terminal, and the first link handover instruction carries the 0 ms handover instruction information for notifying the network.

Wherein, when the second transceiver 1310 feeds back a link handover response to the first network entity according to the first link handover instruction, it is specifically configured to: control the centralized unit of the second network entity to send a first user context modification message to the distribution unit of the second network entity according to the first link handover instruction, and the first user context modification message carries the 0 ms handover indication information for notifying the network; control the distribution unit of the second network entity to performs radio resource configuration for the terminal, generate a second radio resource configuration parameter, and feed hack the second radio resource configuration parameter and the 0 ms handover indication information for notifying the terminal to the centralized unit of the second network entity; and control the central unit of the second network entity to feed back a link handover response to the central unit of the first network entity, and the link handover response carries the 0 ms handover indication information for notifying the terminal and the second radio resource configuration parameter.

Wherein, the link handover response also carries a second data relay address, and the second transceiver 1310 is also used to: control the centralized unit of the second network entity to receive second data sent by the centralized unit of the first network entity through the second data relay address, and the first data is part of the data that the centralized unit of the first network entity needs to send to the terminal.

Wherein, when the first network entity and the second network entity are both secondary network entities, the second transceiver 1310 is receiving the first link handover instruction sent by the first network entity in the process of maintaining the first data transmission link with the terminal, it is specifically used to: receive a first link handover instruction sent by the primary network entity corresponding to the first network entity in the process of maintaining the first data transmission link between the first network entity and the terminal, the first link handover instruction carries 0 ms handover instruction information for notifying the network.

Wherein, when the second transceiver 1310 feeds back a link handover response to the first network entity according to the first link handover instruction, it is specifically configured to: perform radio resource configuration for the terminal, and generate a third radio resource configuration parameter; feed back the link handover response to the primary network entity corresponding to the first network entity according to the first link handover instruction, and the link handover response carries 0 ms handover instruction information for notifying the terminal and the third radio resource configuration parameter.

Wherein, the link handover response also carries a third data relay address, and the second transceiver 1310 is also used to: receive third data sent by the first network entity through the third data relay address received by the first network, where the third data is part of the data that the first network entity needs to send to the terminal.

Wherein, after receiving the link handover response, the primary network entity corresponding to the first network entity sends the third data relay address and the 0 ms handover instruction information for notifying the network to the first network entity.

Wherein, when the second transceiver 1310 sends a link release instruction to the first network entity, it is specifically used to: send a link release instruction to the first network entity when a preset condition is met.

The preset condition includes one or more of: successfully sending a first data packet to the terminal, a preset timer reaching a tuning time, and successfully sending release indication information to the terminal.

Wherein, when the first network entity and the second network entity are both primary network entities including a distribution unit and a centralized unit, the second transceiver 1310 sends a link release instruction to the first network when a preset condition is met, it is specifically used to: when the preset condition is met, control the centralized unit of the second network entity to send a link release instruction to the centralized unit of the first network entity.

Wherein, when the first network entity and the second network entity are both secondary network entities, when the second transceiver 1310 sends a link release instruction to the first network entity when a preset condition is met, it is specifically used to: when the preset condition is met, send preset instruction information to the primary network entity corresponding to the first network entity; wherein the preset indication information is used to instruct the primary network entity corresponding to the first network entity to send the link release instruction to the first network entity.

Wherein, when the first network entity and the second network entity are both primary network entities including a distribution unit and a centralized unit, when the second transceiver 1310 receives the SN state report sent by the first network entity, it is specifically used to: control the centralized unit of the second network entity to receive a SN state repeal sent by the centralized unit of the first network entity according to the received uplink data transmission state information, wherein the uplink data transmission state information received by the centralized unit of the first network entity is sent by the distribution unit of the first network entity when data transmission with the terminal is stopped.

Wherein, when the first network entity and the second network entity are both secondary network entities, when the second transceiver 1310 receives the SN state report sent by the first network entity, it is specifically used to: receive the SN state report sent by the primary network entity corresponding to the first network entity, where the SN state report sent by the primary network entity corresponding to the first network entity is sent by the first network entity to the primary network entity corresponding to the first network entity when the data transmission between the first network entity and the terminal stops.

Among them, in FIG. 13, the bus architecture may include any number of interconnected buses and bridges. Specifically, various circuits of one or more processors represented by the second processor 1300 and the memory represented by the second memory 1320 are linked together. The bus architecture can also link various other circuits such as peripheral devices, voltage regulators, power management circuits, etc., which are all known in the art, and therefore, no further description will be given herein. The bus interface provides the interface. The second transceiver 1310 may be a plurality of elements, that is, including a transmitter and a first transceiver, and provide a unit for communicating with various other devices on the transmission medium. The second processor 1300 is responsible for managing the bus architecture and general processing, and the second memory 1220 can store data used by the second processor 1300 when performing operations.

Those skilled in the art can understand that all or part of the steps in the foregoing embodiments can be implemented by hardware, or by a computer program that instructs related hardware. The computer program includes instructions for performing part or all of the steps of the foregoing method. The computer program can be stored in a readable storage medium, which can be any form of storage medium.

Ninth Embodiment

Figure 14:
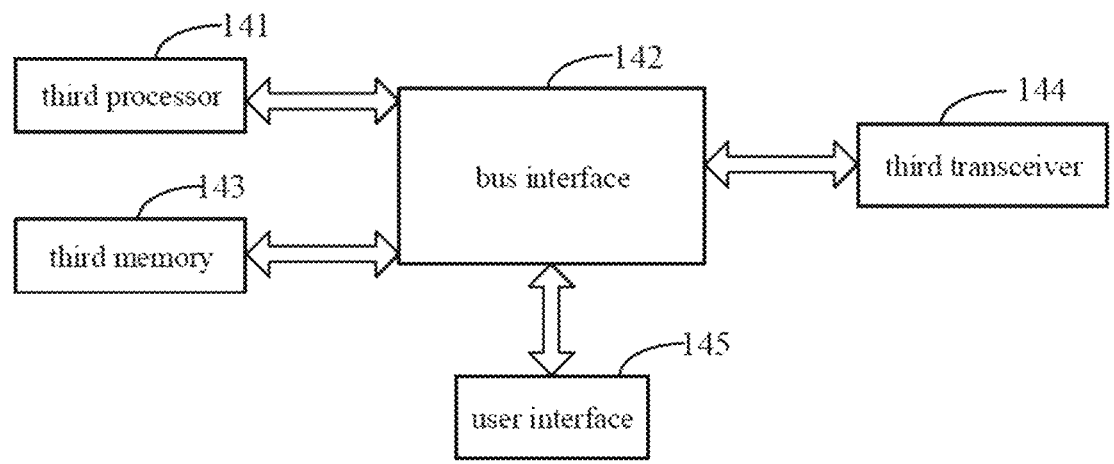
FIG. 14 shows a structural block diagram of a terminal according to a ninth embodiment of the present disclosure.

As shown in FIG. 14, this embodiment provides a terminal, including: a third processor 141; and a third memory 143 connected to the third processor 141 via a bus interface 142, the third memory 143 is used to store programs and data used by the third processor 141 when performing operations. When the third processor 141 calls and executes the programs and data stored in the third memory 143, the following process is executed.

Among them, the third transceiver 144 is connected to the bus interface 142, and is used to receive and send data under the control of the third processor 141. Specifically, the third transceiver 144 is used to: receive a second link handover instruction sent by a first network entity; the third processor 141 is further configured to establish a second data transmission link with a second network entity according to radio resource control (RRC) reconfiguration information carried in the second link handover instruction, and maintain a first data transmission link with the first network entity.

When the first network entity and the second network entity are both primary network entities, the RRC reconfiguration information carried in the second link handover instruction includes an 0 ms handover instruction for notifying the terminal and a first radio resource configuration parameter, where the first radio resource configuration parameter is generated after the second network entity performs radio resource configuration for the terminal.

Wherein, when the first network entity and the second network entity are both primary network entities including a distribution unit and a centralized unit, the third transceiver 144 receives a second link handover instruction sent by the first network entity, it is specifically used to: receive a second link handover instruction sent by a distribution unit of the first network entity, where the RRC reconfiguration information carried in the second link handover instruction includes a second radio resource configuration parameter and 0 ms handover indication information for notifying the terminal, where the second radio resource configuration parameter is generated after the distribution unit of the second network entity performs resource configuration for the terminal.

Wherein, when the first network entity and the second network entity are both secondary network entities, when the third transceiver 144 receives the second link handover instruction sent by the first network entity, it is specifically used to: receive a second link handover instruction sent by the primary network entity corresponding to the first network entity, where the RRC reconfiguration information carried in the second link handover instruction includes a third radio resource configuration parameter and 0 ms handover indication information for notifying the terminal, where the third radio resource configuration parameter is generated after the second network entity performs resource configuration for the terminal.

It should be noted that in FIG. 14, the bus architecture may include any number of interconnected buses and bridges, specifically various circuits of one or more processors represented by the third processor 141 and the memory represented by the third memory 143 are linked together. The bus architecture can also link various other circuits such as peripheral devices, voltage regulators, power management circuits, etc., which are all known in the art, and therefore, no further description will be given herein. The bus interface provides the interface. The third transceiver 144 may be a plurality of elements, including a transmitter and a first transceiver, and provide a unit for communicating with various other devices on the transmission medium. For different terminals, the user interface 145 may also be an interface capable of connecting externally and internally with required equipment. The connected equipment includes but not limited to a keypad, a display, a speaker, a microphone, a joystick, and the like. The third processor 141 is responsible for managing the bus architecture and general processing, and the third memory 143 can store data used Ivy the third processor 141 when performing operations.

Those skilled in the art can understand that all or part of the steps in the foregoing embodiments can be implemented by hardware, or by a computer program that instructs related hardware. The computer program includes instructions for performing part or all of the steps of the foregoing method. The computer program can be stored in a readable storage medium, which can be any form of storage medium.

In addition, it should be pointed out that in the device and method of the present disclosure, obviously, each component or each step can be decomposed and/or recombined. These decomposition and/or recombination should be regarded as equivalent solutions of the present disclosure. In addition, the steps of performing the above series of processing can naturally be performed in a chronological order in the description, but do not necessarily need to be performed in a chronological order, and some steps can be performed in parallel or independently of each other. Those of ordinary skill in the art can understand that all or any of the steps of the method or components of the device of the present disclosure can be used in any computing device (including a processor, storage medium, etc.) or a network of computing devices, using hardware, firmware, software, or a combination of them. This can be achieved by those of ordinary skill in the art using their basic programming skills after reading the description of the present disclosure.

Therefore, the purpose of the present disclosure can also be realized by running a program or a group of programs on any computing device. The computing device may be a well-known general-purpose device. Therefore, the purpose of the present disclosure can also be achieved only by providing a program product containing program code for implementing the method or device. That is, such a program product also constitutes the present disclosure, and a storage medium storing such a program product also constitutes the present disclosure. Obviously, the storage medium may be any well-known storage medium or any storage medium developed in the future. It should also be pointed out that in the device and method of the present disclosure, obviously, each component or each step can be decomposed and/or recombined. These decomposition and/or recombination should be regarded as equivalent solutions of the present disclosure. In addition, the steps of performing the above-mentioned series of processing can naturally be performed in chronological order in the description, but do not necessarily need to be performed in chronological order. Some steps can be performed in parallel or independently of each other.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A link handover method applied to a first network entity, comprising steps of:
sending a first link handover instruction to a second network entity, and maintaining a first data transmission link with a terminal;
receiving a link handover response fed back by the second network entity according to the first link handover instruction;
sending a second link handover instruction to the terminal according to the link handover response; wherein the second link handover instruction carries radio resource control (RRC) reconfiguration information for establishing a second data transmission link between the terminal and the second network entity;
wherein when the first network entity and the second network entity are both primary network entities, the first link handover instruction carries 0 ms handover indication information for notifying a network; the link handover response carries 0 ms handover indication information for notifying the terminal and a first radio resource configuration parameter generated after the second network entity performs radio resource configuration for the terminal; the RRC reconfiguration information includes the 0 ms handover indication information for notifying the terminal and the first radio resource configuration parameter.

2. The method according to claim 1, further comprising:
receiving a link release instruction sent by the second network entity after the second data transmission link is established;
releasing the first data transmission link and radio resource configuration on the first network entity side according to the link release instruction.

3. The method according to claim 2, wherein when the first network entity and the second network entity are both primary network entities each including a distribution unit and a centralized unit, the step of receiving a link release instruction sent by the second network entity after the second data transmission link has been established includes:
receiving, by a centralized unit of the first network entity, the link release instruction sent by a centralized unit of the second network entity after the second data transmission link has been established.

4. The method according to claim 2, wherein when the first network entity and the second network entity are both secondary network entities, the step of receiving the link release instruction sent by the second network entity after the second data transmission link has been established comprises:
receiving the link release instruction sent by the primary network entity corresponding to the first network entity after the second data transmission link has been established.

5. The method according to claim 2, wherein before or after the step of receiving the link release indication sent by the second network entity after the second data transmission link has been established, the method further comprises:
sending a packet data convergence protocol serial number (SN) state report to the second network entity, wherein the SN state report includes information about data that is not successfully sent to the terminal.

6. The method according to claim 5, wherein when the first network entity and the second network entity are both primary network entities each including a distribution unit and a centralized unit, the step of sending an SN state report to the second network entity comprises:
when data transmission between a distribution unit of the first network entity and the terminal stops, sending, by the distribution unit of the first network entity, uplink data transmission state information to a centralized unit of the first network entity;
sending, by the centralized unit of the first network entity, the SN state report to a centralized unit of the second network entity according to the uplink data transmission state information.

7. The method according to claim 5, wherein when the first network entity and the second network entity are secondary network entities, the step of sending an SN state report to the second network entity comprises:
when data transmission between the first network entity and the terminal is stopped, sending, by the first network entity, the SN state report to the primary network entity corresponding to the first network entity, and forwarding, by the primary entity corresponding to the first network entity, the SN state report to the second network entity.

8. The method according to claim 1, wherein the link handover response further includes a first data relay address; after the step of receiving the link handover response fed back by the second network entity according to the first link handover instruction, the method further includes:
sending part of data that needs to be sent to the terminal to the second network entity through the first data relay address.

9. The method according to claim 1, wherein when the first network entity and the second network entity are both primary network entities each including a distribution unit and a centralized unit, the step of sending a first link handover instruction to the second network entity comprises:
sending, by a centralized unit of the first network entity, the first link handover instruction to a centralized unit of the second network entity, and the first link handover instruction carries 0 ms handover instruction information for notifying a network.

10. The method according to claim 9, wherein the step of receiving a link handover response fed back by the second network entity according to the first link handover instruction comprises:
receiving, by the centralized unit of the first network entity, the link handover response fed back by the centralized unit of the second network entity according to the first link handover instruction, wherein the link handover response carries the 0 ms handover indication information for notifying the terminal and a second radio resource configuration parameter;
wherein the second radio resource configuration parameter is generated after the distribution unit of the second network entity receives a first user context modification message sent by the centralized unit of the second network entity and configures a radio resource for the terminal, after the distribution unit of the second network entity generates the second radio resource configuration parameter, the distribution unit of the second network entity forwards the second radio resource configuration parameter to the centralized unit of the second network entity, and the first user context modification message carries the 0 ms handover indication information for notifying the network.

11. The method according to claim 10, wherein the step of sending a second link handover instruction to the terminal according to the link handover response comprises:
sending, by the centralized unit of the first network entity, a second user equipment context modification message to the distribution unit of the first network entity, wherein the second user equipment context modification message carries the second radio resource configuration parameter and the 0 ms handover instruction information for notifying the terminal;
sending, by the distribution unit of the first network entity, a second link handover instruction to the terminal, wherein RRC reconfiguration information carried in the second link handover instruction includes the second radio resource configuration parameter and the 0 ms handover instruction information for notifying the terminal;
wherein the link handover response also carries a second data relay address, and after receiving, by the centralized unit of the first network entity, the link handover response fed back by the centralized unit of the second network entity according to the first link handover instruction, the method further comprises:
sending, by the centralized unit of the first network entity, part of the data that needs to be sent to the terminal to the centralized unit of the second network entity through the second data relay address.

12. The method according to claim 1, wherein when the first network entity and the second network entity are both secondary network entities, the step of sending a first link handover instruction to the second network entity comprises:
sending, by a primary network entity corresponding to the first network entity, the first link handover instruction to the second network entity, wherein the first link handover instruction carries 0 ms handover instruction information for notifying a network.

13. The method according to claim 12, wherein the step of receiving the link handover response fed back by the second network entity according to the first link handover instruction includes:
receiving, by the primary network entity corresponding to the first network entity, the link handover response sent by the second network entity after receiving the first link handover instruction and performing radio resource configuration for the terminal, the link handover response carries a third radio resource configuration parameter and the 0 ms handover indication information for notifying the terminal, and the third radio resource configuration parameter is generated after the second network entity performs radio resource configuration for the terminal.

14. The method according to claim 10, wherein the step of sending a second link handover instruction to the terminal according to the link handover response comprises:
sending, by the primary network entity corresponding to the first network entity, a second link handover instruction to the terminal according to the link handover response, wherein RRC reconfiguration information carried in the second link handover instruction includes the third radio resource configuration parameter and the 0 ms handover indication information for notifying the terminal;
wherein the link handover response also carries a third data relay address, and after the step of receiving, by the primary network entity corresponding to the first network entity, the link handover response sent by the second network entity after receiving the first link handover instruction and performing radio resource configuration for the terminal, the method further comprises:
receiving, by the first network entity, the third data relay address and the 0 ms handover indication information for notifying the network sent by the primary network entity corresponding to the first network entity;
sending, by the first network entity, part of the data that needs to be sent to the terminal to the second network entity through the third data relay address.

15. A network entity, wherein the network entity is a first network entity, comprising a first transceiver; a first memory, and a first processor, and program stored on the first memory and executed by the first processor, so as to implement the link handover method according to claim 1.

16. A link handover method applied to a second network entity, comprising steps of:
receiving a first link handover instruction sent by a first network entity in the process of maintaining a first data transmission link with a terminal;
feeding back a link handover response to the first network entity according to the first link handover instruction, and establishing a second data transmission link with the terminal;
wherein when the first network entity and the second network entity are both primary network entities, the first link handover indication carries 0 ms handover indication information used for notifying a network;
the step of feeding back a link handover response to the first network entity according to the first link handover instruction comprises:
performing radio resource configuration for the terminal, and generating a first radio resource configuration parameter;
feeding back a link handover response to the first network entity according to the first link handover instruction, wherein the link handover response carries 0 ms handover indication information for notifying the terminal and the first radio resource configuration parameter.

17. A network entity, wherein the network entity is a second network entity, comprising a second transceiver; a second memory, and a second processor, and program stored on the second memory and executed by the second processor, so as to implement the link handover method according to claim 16.

18. A link handover method applied to a terminal, comprising steps of:
receiving a second link handover instruction sent by a first network entity;
establishing a second data transmission link with a second network entity according to radio resource control (RRC) reconfiguration information carried in the second link handover instruction, and maintaining a first data transmission link with the first network entity;
wherein when the first network entity and the second network entity are both primary network entities each including a distribution unit and a centralized unit, the step of receiving a second link handover instruction sent by the first network entity comprises:
receiving the second link handover instruction sent by a distribution unit of the first network entity, wherein the RRC reconfiguration information carried in the second link handover instruction includes a second radio resource configuration parameter and the 0 ms handover indication information for notifying the terminal, wherein the second radio resource configuration parameter is generated after the distribution unit of the second network entity performs resource configuration for the terminal.

19. A terminal, comprising a third transceiver; a third memory, and a third processor, and program stored on the third memory and executed by the third processor, so as to implement the link handover method according to claim 18.

* * * * *